United States Patent
Sun et al.

(10) Patent No.: US 11,647,560 B2
(45) Date of Patent: *May 9, 2023

(54) CANCELLATION POLICY FOR RADIO RESOURCE CONTROL CONFIGURED UPLINK TRANSMISSIONS

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,436

(22) Filed: Jun. 29, 2021

(65) Prior Publication Data

US 2021/0400764 A1    Dec. 23, 2021

Related U.S. Application Data

(63) Continuation of application No. 16/363,730, filed on Mar. 25, 2019, now Pat. No. 11,051,357.

(Continued)

(51) Int. Cl.
*H04W 76/30* (2018.01)
*H04W 72/04* (2009.01)
(Continued)

(52) U.S. Cl.
CPC ......... *H04W 76/30* (2018.02); *H04W 72/042* (2013.01); *H04W 72/0446* (2013.01); *H04W 76/11* (2018.02); *H04W 76/27* (2018.02)

(58) Field of Classification Search
CPC ............... H04W 76/30; H04W 72/042; H04W 72/0446; H04W 76/11; H04W 76/27
See application file for complete search history.

(56) References Cited

U.S. PATENT DOCUMENTS

| 8,447,236 B2 | 5/2013 | Gorokhov et al. |
| 8,867,380 B2 | 10/2014 | Gorokhov et al. |

(Continued)

FOREIGN PATENT DOCUMENTS

| CN | 101610578 A | 12/2009 |
| CN | 104284406 A | 1/2015 |

(Continued)

OTHER PUBLICATIONS

"3rd Generation Partnership Project; Technical Specification Group Radio Access Network; NR; Physical layer procedures for control (Release 15)", 3GPP Standard; Technical Specification; 3GPP TS 38.213, 3rd Generation Partnership Project (3GPP), Mobile Competence Centre ; 650, Route Des Lucioles ; F-06921 Sophia-Antipolis Cedex ; France, vol. RAN WG1, No. V1.1.1, Dec. 12, 2017, XP051391907, 40 pages, [retrieved on Dec. 12, 2017], section 9.1. 1; p. 19 section 11.1.2; p. 36-p. 37.

(Continued)

*Primary Examiner* — Mohammad S Anwar
(74) *Attorney, Agent, or Firm* — QUALCOMM Incorporated

(57) ABSTRACT

Methods, systems, and devices for wireless communication are described. The examples described herein provide a procedure at a user equipment (UE) for determining whether to transmit radio resource control (RRC) configured uplink signals to a base station based on detected slot format indications (SFIs) and/or undetected SFIs in multiple control channels. In particular, a UE may identify multiple control channels configured to include SFIs from a base station, and, as described herein, the UE may determine whether to transmit RRC configured uplink signals in a set of symbols based on a configuration of the set of symbols (e.g., uplink, downlink, or flexible) determined based on detected SFIs and/or undetected SFIs in the multiple control channels. The (Continued)

UE may be able to determine whether to transmit RRC configured uplink signals in a set of symbols based on any combination of detected SFIs and undetected SFIs.

30 Claims, 14 Drawing Sheets

Related U.S. Application Data

(60) Provisional application No. 62/653,200, filed on Apr. 5, 2018.

(51) Int. Cl.
*H04W 76/11* (2018.01)
*H04W 76/27* (2018.01)
*H04W 72/0446* (2023.01)

(56) References Cited

U.S. PATENT DOCUMENTS

| | | | |
|---|---|---|---|
| 8,867,493 | B2 | 10/2014 | Gorokhov et al. |
| 11,051,357 | B2 * | 6/2021 | Sun ............... H04W 72/0446 |
| 2018/0092094 | A1 | 3/2018 | Ly et al. |
| 2018/0279274 | A1 | 9/2018 | Sun et al. |
| 2019/0045529 | A1 | 2/2019 | Xiong et al. |
| 2019/0104536 | A1 | 4/2019 | Wang et al. |

FOREIGN PATENT DOCUMENTS

| | | |
|---|---|---|
| WO | WO-2009140637 | 11/2009 |
| WO | WO-2010088662 | 8/2010 |
| WO | WO-2010088664 | 8/2010 |
| WO | WO-2011038410 A1 | 3/2011 |

OTHER PUBLICATIONS

CATT: "Outstanding Aspects of Slot Format Indication", 3GPP Draft, 3GPP TSG RAN WG1 Meeting AH_#NR3, R1-1715815, Outstanding Aspects of Slot Format Indication, 3rd Generation Partnership Project (3GPP), Mobile Competence Centre, 650, Route Des Lucioles, F-06921, Sophia-Antipolis Cedex, France, vol. RAN WG1, No. Nagoya, Japan, Sep. 18, 2017-Sep. 21, 2017, Sep. 17, 2017 (Sep. 17, 2017), XP051339275, 10 Pages, Retrieved from the Internet: URL:http://www.3gpp.org/ftp/Meetings_3GPP_SYNC/RAN1/Docs/ [retrieved on Sep. 17, 2017], section 5; p. 8.
International Search Report and Written Opinion—PCT/US2019/024084—ISA/EPO—dated Sep. 17, 2019.
LG Electronics: "Discussion on Group Common PDCCH," 3GPP Draft; R1-1800373, 3GPP TSG RAN WG1 NR AH1801, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051384828, 15 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] section 2.1.1; p. 5 section 2.1.2; p. 5-p. 6 section 2.1.4; p. 7-p. 8.
Partial International Search Report—PCT/US2019/024084—ISA/EPO—dated Jun. 13, 2019.
Samsung: "Corrections on UE-Group Common PDCCH", 3GPP Draft, 3GPP TSG RAN WG1 #92, R1-1801975 GC-PDCCH, 3rd Generation Partnership Project (3GPP), Mobile Competence Centre; 650, Route Des Lucioles, F-06921 Sophia-Antipolis Cedex, France, vol. RAN WG1, No. Athens, Greece; Feb. 26, 2018-Mar. 2, 2018, Feb. 17, 2018 (Feb. 17, 2018), XP051397779, 3 Pages, Retrieved from the Internet: URL: http://www.3gpp.org/ftp/tsg%5Fran/WG1%5FRL1/TSGR1%5F92/Docs/ [retrieved on Feb. 17, 2018], Slot Configuration; DCI Format 2 0 Used For Semi-Static Configuration; Take Into Consideration SFI and DCI for UL Transmissions; Paragraph [0002].
Samsung: "Corrections on Procedures for UL Transmissions," 3GPP Draft, R1-1800455, 3GPP TSG RAN WG1 Meeting AH 1801, Correction on Procedures for UL Transmissions, 3rd Generation Partnership Project (3GPP), Mobile Competence Centre; 650, Route Des Lucioles; F-06921 Sophia-Antipolis Cedex; F, vol. RAN WG1, No. Vancouver, Canada; Jan. 22, 2018-Jan. 26, 2018, Jan. 12, 2018, XP051384339, 4 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 12, 2018] section 1; p. 2 section 5; p. 3-p. 4.
Vivo: "Remaining Issues on UL Data Transmission Procedure," 3GPP Draft; R1-1801542_Remaning Issues on UL Data Transmission Procedure, 3rd Generation Partnership Project (3GPP), Mobile Competence Centre; 650, Route Des Lucioles; F-06921 Sophia-Antipolis Cede, vol. RAN WG1, No. Athens, Greece; Feb. 26, 2018-Mar. 2, 2018, Feb. 15, 2018, XP051396794, 4 pages, Retrieved from the Internet: URL: http://www.3gpp.org/ftp/tsg%5Fran/WG1%5FRL1/TSGR1%5F92/Docs/ [retrieved on Feb. 15, 2018] section 2.4, 3.
Nokia, et al., "Remaining Issues on UE Behaviours Related to Slot Configuration in TS 38.213", 3GPP Draft, 3GPP TSG RAN WG1 Meeting #92, R1-1802544, Athens, Greece, Feb. 26-Mar. 2, 2018, XP051398006, 3 Pages.
European Search Report—EP22172180—Search Authority—The Hague—dated Jul. 7, 2022 (182785EPD1).
International Preliminary Report on Patentability—PCT/US2019/024084, The International Bureau of WIPO—Geneva, Switzerland, dated Oct. 15, 2020 (182785WO).
Apple Inc: "Slot Format Indicator in Group-Common PDCCH", 3GPP Draft, 3GPP TSG-RAN WG1 #91, R1-1720118, Slot Format Indicator in Group-Common PDCCH,V2, 3rd Generation Partnership Project (3GPP), Mobile Competence Centre, 650, Route Des Lucioles, F-06921 Sophia-Antipolis Cedex, vol. RAN WG1, No. Reno, US, Nov. 27, 2017-Dec. 1, 2017, Nov. 18, 2017 (Nov. 18, 2017), XP051369791, 8 Pages, section 2.1.
BIRD67: "TD-SCDMA Basic Information on Time Slots", Feb. 21, 2011, 7 Pages.
Campos J., "Understanding the 5G NR Physical Layer", Keysight Technologies release, Dec. 31, 2017, 111 Pages, Nov. 1, 2017.
LG Electronics: "Discussion on UE Behaviour for the group common PDCCH", 3GPP TSG RAN WG1 Meeting #89, R1-1707635, Hangzhou, China, May 15-19, 2017, 6 Pages, May 6, 2017.
European Search Report—EP22215470—Search Authority—The Hague—dated Feb. 20, 2023.

* cited by examiner ered UPLINK TRANSMISSIONS" filed Mar. 25, 2019, which claims the benefit of U.S. Provisional Patent Application No. 62/653,200 by SUN, et al., entitled "CANCELLATION POLICY FOR RADIO RESOURCE CONTROL CONFIGURED UPLINK TRANSMISSIONS," filed Apr. 5, 2018, assigned to the assignee hereof, and expressly incorporated herein.

CANCELLATION POLICY FOR RADIO RESOURCE CONTROL CONFIGURED UPLINK TRANSMISSIONS

CROSS REFERENCES

The present Application for Patent is a Continuation of U.S. patent application Ser. No. 16/363,730 by SUN et al., entitled "CANCELLATION POLICY FOR RADIO RESOURCE CONTROL CONFIGURED UPLINK TRANSMISSIONS" filed Mar. 25, 2019, which claims the benefit of U.S. Provisional Patent Application No. 62/653,200 by SUN, et al., entitled "CANCELLATION POLICY FOR RADIO RESOURCE CONTROL CONFIGURED UPLINK TRANSMISSIONS," filed Apr. 5, 2018, assigned to the assignee hereof, and expressly incorporated herein.

BACKGROUND

The following relates generally to wireless communication and more specifically to a cancellation policy for radio resource control (RRC) configured uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some cases, a UE may be scheduled to transmit RRC configured uplink signals to a base station in a set of symbols. In some wireless communications systems, however, the set of symbols may be configured dynamically as uplink symbols, downlink symbols, or flexible symbols (e.g., where flexible symbols may be used for either uplink or downlink communications). In such systems, it may be appropriate for the UE to determine the configuration of the set of symbols prior to transmitting the RRC configured uplink signals in the set of symbols. Conventional techniques for determining the configuration of a set of symbols prior to transmitting RRC configured uplink signals in the set of symbols may be deficient.

SUMMARY

The described techniques relate to improved methods, systems, devices, or apparatuses that support a cancellation policy for radio resource control (RRC) configured uplink transmissions. The examples described herein provide a procedure at a user equipment (UE) for determining whether to transmit RRC configured uplink signals to a base station based on detected slot format indications (SFIs) and/or undetected SFIs in multiple control channels. In particular, a UE may identify multiple control channels configured to include SFIs from a base station, and, as described herein, the UE may determine whether to transmit RRC configured uplink signals in a set of symbols based on a configuration of the set of symbols determined using the detected SFIs and/or undetected SFIs in the multiple control channels. For instance, the UE may transmit the RRC configured uplink signals when it is determined that the set of symbols is configured as uplink symbols, and the UE may cancel transmission of the RRC configured uplink signals when it is determined that the set of symbols is configured as flexible symbols or downlink symbols.

A method for wireless communication at a UE is described. The method may include identifying a plurality of control channels, where each control channel is configured to include an SFI for one or more slots, identifying the control channels where the SFI is detected and the control channels where the SFI is undetected, identifying a set of symbols in a slot to transmit RRC configured uplink signals to a base station, determining whether the set of symbols in the slot is configured as uplink, flexible, or downlink based at least in part on the detected SFIs, the undetected SFIs, or a combination thereof, transmitting the RRC configured uplink signals when it is determined that the set of symbols in the slot is configured as uplink, and canceling transmission of the RRC configured uplink signals when it is determined that the set of symbols in the slot is configured as flexible or downlink.

An apparatus for wireless communication at a UE is described. The apparatus may include means for identifying a plurality of control channels, where each control channel is configured to include an SFI for one or more slots, means for identifying the control channels where the SFI is detected and the control channels where the SFI is undetected, means for identifying a set of symbols in a slot to transmit RRC configured uplink signals to a base station, means for determining whether the set of symbols in the slot is configured as uplink, flexible, or downlink based at least in part on the detected SFIs, the undetected SFIs, or a combination thereof, means for transmitting the RRC configured uplink signals when it is determined that the set of symbols in the slot is configured as uplink, and means for canceling transmission of the RRC configured uplink signals when it is determined that the set of symbols in the slot is configured as flexible or downlink.

Another apparatus for wireless communication at a UE is described. The apparatus may include a processor, memory in electronic communication with the processor, and instructions stored in the memory. The instructions may be operable to cause the processor to identify a plurality of control channels, where each control channel is configured to include an SFI for one or more slots, identify the control channels where the SFI is detected and the control channels where the SFI is undetected, identify a set of symbols in a slot to transmit RRC configured uplink signals to a base station, determine whether the set of symbols in the slot is configured as uplink, flexible, or downlink based at least in part on the detected SFIs, the undetected SFIs, or a combination thereof, transmit the RRC configured uplink signals when it is determined that the set of symbols in the slot is configured as uplink, and cancel transmission of the RRC configured uplink signals when it is determined that the set of symbols in the slot is configured as flexible or downlink.

A non-transitory computer-readable medium for wireless communication at a UE is described. The non-transitory computer-readable medium may include instructions operable to cause a processor to identify a plurality of control channels, where each control channel is configured to include an SFI for one or more slots, identify the control channels where the SFI is detected and the control channels where the SFI is undetected, identify a set of symbols in a slot to transmit RRC configured uplink signals to a base station, determine whether the set of symbols in the slot is configured as uplink, flexible, or downlink based at least in part on the detected SFIs, the undetected SFIs, or a combination thereof, transmit the RRC configured uplink signals when it is determined that the set of symbols in the slot is configured as uplink, and cancel transmission of the RRC configured uplink signals when it is determined that the set of symbols in the slot is configured as flexible or downlink.

Some examples of the method, apparatus, and non-transitory computer-readable medium described above may further include processes, features, means, or instructions for identifying at least one control channel of the plurality of control channels where an SFI with a range that includes the set of symbols in the slot may be detected. Some examples of the method, apparatus, and non-transitory computer-readable medium described above may further include processes, features, means, or instructions for determining that the SFI may be detected in the at least one control channel in advance of the set of symbols in the slot by a threshold amount of time, and determining whether the set of symbols in the slot may be configured as uplink, flexible, or downlink based at least in part on the SFI. Some examples of the method, apparatus, and non-transitory computer-readable medium described above may further include processes, features, means, or instructions for determining that the SFI may be detected in the at least one control channel within a threshold amount of time prior to the set of symbols in the slot, and determining whether the set of symbols in the slot may be configured as uplink, flexible, or downlink independent of the SFI.

Some examples of the method, apparatus, and non-transitory computer-readable medium described above may further include processes, features, means, or instructions for identifying that at least one SFI may be detected in the control channels, where the detected at least one SFI fails to cover a range that includes the set of symbols, and that at least one SFI may be undetected in the control channels. Some examples of the method, apparatus, and non-transitory computer-readable medium described above may further include processes, features, means, or instructions for determining that the slot may be configured as flexible based at least in part on the identifying. Some examples of the method, apparatus, and non-transitory computer-readable medium described above may further include processes, features, means, or instructions for canceling transmission of the RRC configured uplink signals based at least in part on the determination.

Some examples of the method, apparatus, and non-transitory computer-readable medium described above may further include processes, features, means, or instructions for identifying that at least one SFI may be detected in the control channels, where the detected at least one SFI fails to cover a range that includes the set of symbols, and that no SFIs may be undetected in the control channels. Some examples of the method, apparatus, and non-transitory computer-readable medium described above may further include processes, features, means, or instructions for determining that the slot may be configured as uplink based at least in part on the identifying. Some examples of the method, apparatus, and non-transitory computer-readable medium described above may further include processes, features, means, or instructions for transmitting the RRC configured uplink signals based at least in part on the determination.

Some examples of the method, apparatus, and non-transitory computer-readable medium described above may further include processes, features, means, or instructions for identifying that no SFIs may be detected in the control channels and that at least one SFI may be undetected in the control channels. Some examples of the method, apparatus, and non-transitory computer-readable medium described above may further include processes, features, means, or instructions for determining that the slot may be configured as flexible based at least in part on the identifying. Some examples of the method, apparatus, and non-transitory computer-readable medium described above may further include processes, features, means, or instructions for canceling transmission of the RRC configured uplink signals based at least in part on the determination.

Some examples of the method, apparatus, and non-transitory computer-readable medium described above may further include processes, features, means, or instructions for identifying that no SFIs may be detected in the control channels and that no SFIs may be undetected in the control channels. Some examples of the method, apparatus, and non-transitory computer-readable medium described above may further include processes, features, means, or instructions for determining that the slot may be configured as uplink based at least in part on the identifying. Some examples of the method, apparatus, and non-transitory computer-readable medium described above may further include processes, features, means, or instructions for transmitting the RRC configured uplink signals based at least in part on the determination.

In some examples of the method, apparatus, and non-transitory computer-readable medium described above, each control channel may be configured to include an SFI indicating the slot formats for one or more slots with a range that potentially includes the set of symbols in the slot. In some examples of the method, apparatus, and non-transitory computer-readable medium described above, the plurality of control channels may be identified based at least in part on a maximum range of SFIs. In some examples of the method, apparatus, and non-transitory computer-readable medium described above, the maximum range of SFIs may be determined based at least in part on a look-up table that indicates the relationship between SFIs and slot formats for ranges of slots. In some examples of the method, apparatus, and non-transitory computer-readable medium described above, the RRC configured uplink signals include a scheduling request (SR), sounding reference signals (SRSs), uplink signals scheduled using semi-persistent scheduling (SPS), or a combination thereof.

A method for wireless communication at a UE is described. The method may include receiving an SFI for one or more slots in a control channel from a base station, determining whether the SFI is intended for the UE, determining a configuration of the one or more slots based at least in part on determining whether the SFI is intended for the UE, and communicating in the one or more slots based at least in part on the determined configuration.

An apparatus for wireless communication at a UE is described. The apparatus may include means for receiving an SFI for one or more slots in a control channel from a base station, means for determining whether the SFI is intended for the UE, means for determining a configuration of the one or more slots based at least in part on determining whether the SFI is intended for the UE, and means for communicating in the one or more slots based at least in part on the determined configuration.

Another apparatus for wireless communication at a UE is described. The apparatus may include a processor, memory in electronic communication with the processor, and instructions stored in the memory. The instructions may be operable to cause the processor to receive an SFI for one or more slots in a control channel from a base station, determine whether the SFI is intended for the UE, determine a configuration of the one or more slots based at least in part on determining whether the SFI is intended for the UE, and communicate in the one or more slots based at least in part on the determined configuration.

A non-transitory computer-readable medium for wireless communication at a UE is described. The non-transitory computer-readable medium may include instructions operable to cause a processor to receive an SFI for one or more slots in a control channel from a base station, determine whether the SFI is intended for the UE, determine a configuration of the one or more slots based at least in part on determining whether the SFI is intended for the UE, and communicate in the one or more slots based at least in part on the determined configuration.

In some examples of the method, apparatus, and non-transitory computer-readable medium described above, determining the configuration of the one or more slots based at least in part on whether the SFI may be intended for the UE includes determining the configuration of the one or more slots based at least in part on the SFI when the SFI may be intended for the UE and determining the configuration of the one or more slots independent of the SFI when the SFI may be not intended for the UE.

In some examples of the method, apparatus, and non-transitory computer-readable medium described above, determining whether the SFI may be intended for the UE includes receiving one or more indications of at least one beam associated with the received SFI, determining whether the at least one beam includes a beam used for communication between the UE and the base station, and determining whether the SFI may be intended for the UE based at least in part on determining whether the at least one beam includes the beam used for communication between the UE and the base station.

In some examples of the method, apparatus, and non-transitory computer-readable medium described above, the one or more indications include transmission configuration indications (TCIs) or beam index indications. In some examples of the method, apparatus, and non-transitory computer-readable medium described above, the one or more indications may be received in downlink control information (DCI) that includes the SFI or in other DCI. In some examples of the method, apparatus, and non-transitory computer-readable medium described above, determining whether the SFI may be intended for the UE includes receiving an indication that the SFI may be intended for any receiving UE, and determining that the SFI may be intended for the UE based at least in part on receiving the SFI.

In some examples of the method, apparatus, and non-transitory computer-readable medium described above, determining whether the SFI may be intended for the UE includes successfully descrambling the SFI using an SFI-specific radio network temporary identifier (RNTI) configured at the UE, where the configuration of the one or more slots may be determined based at least in part on the SFI. In some examples of the method, apparatus, and non-transitory computer-readable medium described above, determining whether the SFI may be intended for the UE includes failing to descramble the SFI using an SFI-specific RNTI configured at the UE, where the configuration of the one or more slots may be determined based at least in part on the SFI.

A method for wireless communication at a base station is described. The method may include identifying a configuration of one or more slots to be used for communication with one or more UEs, transmitting an SFI for the one or more slots in a control channel intended for the one or more UEs based at least in part on the identifying, and communicating in the one or more slots with the one or more UEs based at least in part on the transmitting.

An apparatus for wireless communication at a base station is described. The apparatus may include means for identifying a configuration of one or more slots to be used for communication with one or more UEs, means for transmitting an SFI for the one or more slots in a control channel intended for the one or more UEs based at least in part on the identifying, and means for communicating in the one or more slots with the one or more UEs based at least in part on the transmitting.

Another apparatus for wireless communication at a base station is described. The apparatus may include a processor, memory in electronic communication with the processor, and instructions stored in the memory. The instructions may be operable to cause the processor to identify a configuration of one or more slots to be used for communication with one or more UEs, transmit an SFI for the one or more slots in a control channel intended for the one or more UEs based at least in part on the identifying, and communicate in the one or more slots with the one or more UEs based at least in part on the transmitting.

A non-transitory computer-readable medium for wireless communication at a base station is described. The non-transitory computer-readable medium may include instructions operable to cause a processor to identify a configuration of one or more slots to be used for communication with one or more UEs, transmit an SFI for the one or more slots in a control channel intended for the one or more UEs based at least in part on the identifying, and communicate in the one or more slots with the one or more UEs based at least in part on the transmitting.

In some examples of the method, apparatus, and non-transitory computer-readable medium described above, transmitting the SFI intended for the one or more UEs includes transmitting one or more indications of at least one beam associated with the SFI, where the at least one beam includes one or more beams used for communication between the base station and the one or more UEs. In some examples of the method, apparatus, and non-transitory computer-readable medium described above, the one or more indications include TCIs or beam index indications. In some examples of the method, apparatus, and non-transitory computer-readable medium described above, the one or more indications may be transmitted in DCI that includes the SFI or in other DCI.

In some examples of the method, apparatus, and non-transitory computer-readable medium described above, transmitting the SFI intended for the one or more UEs includes transmitting an indication that the SFI may be intended for any receiving UE. In some examples of the method, apparatus, and non-transitory computer-readable medium described above, transmitting the SFI intended for the one or more UEs includes scrambling the SFI using an SFI-RNTI configured at the one or more UEs. Some examples of the method, apparatus, and non-transitory computer-readable medium described above may further include processes, features, means, or instructions for transmitting the scrambled SFI to the one or more UEs.

DETAILED DESCRIPTION

Figure 1:
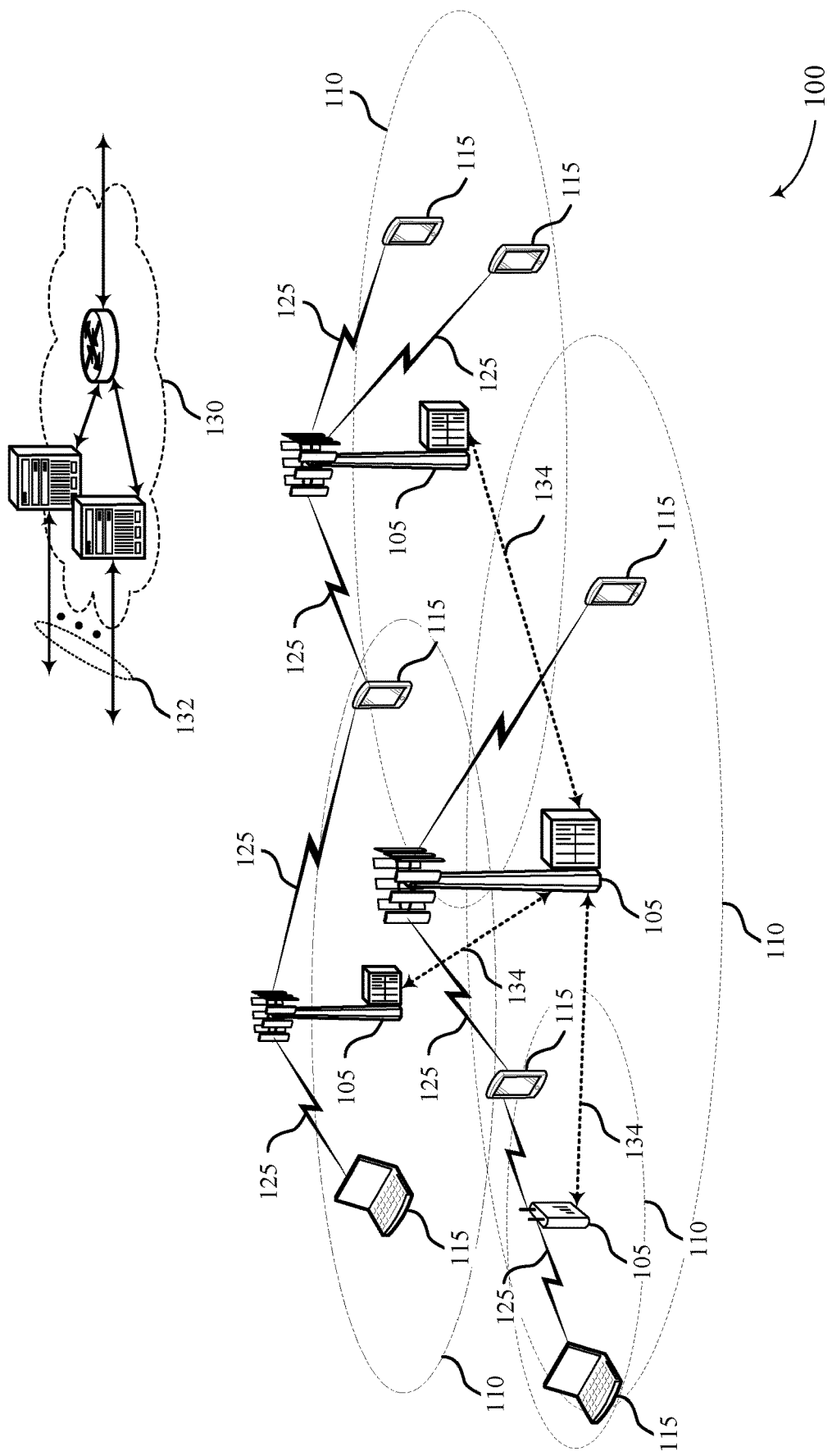
FIG. 1 illustrates an example of a wireless communications system that supports a cancellation policy for radio resource control (RRC) configured uplink transmissions in accordance with aspects of the present disclosure.

Some wireless communications systems may support techniques for dynamically configuring resources for uplink communication or downlink communication between a base station and a user equipment (UE) to improve the flexibility of the systems. For instance, a base station may configure a slot as an uplink slot, downlink slot, or flexible slot (e.g., where a flexible slot may be used for either uplink or downlink communications). Specifically, the base station may transmit a slot format indication (SFI) to a UE to indicate the configuration of the slot. The UE may then receive the SFI and determine the configuration of the slot prior to communicating in the slot. In some cases, however, a UE may be scheduled to transmit uplink signals in a slot before the slot is configured as uplink, downlink, or flexible (i.e., using the SFI). For example, the UE may be configured to transmit radio resource control (RRC) configured uplink signals in a slot before the slot is configured as uplink, downlink, or flexible. In such cases, in order to prevent interference between the uplink transmission and a downlink transmission scheduled during a slot, the UE may be configured to cancel the uplink transmission in the slot when the UE determines that the slot is configured as a downlink slot or a flexible slot.

Specifically, the UE may determine the configuration of a slot before transmitting uplink signals in the slot (e.g., based on an SFI received from a base station), and the UE may determine whether to transmit or cancel transmission of the uplink signals in the slot based on the determined configuration. Using these techniques, the UE may avoid transmitting uplink signals in a slot used for a downlink transmission (e.g., in a flexible or downlink slot). In some cases, however, though a UE may receive an SFI indicating the configuration of a slot prior to the slot, the UE may not be able to determine the configuration of the slot before an uplink transmission in the slot. For example, the UE 115 may not be able to finish processing the SFI before an uplink transmission in the slot. In such cases, the UE may not be able to determine whether to transmit or cancel transmission of uplink signals in the slot before the uplink transmission, which may be result in interference in a wireless communications system.

In order to ensure that a UE is able to cancel a transmission of uplink signals in any portion of a slot, different SFIs may indicate the format of overlapping ranges of slots such that the UE may rely on multiple SFIs in multiple control channels to determine the configuration of a slot (e.g., in case one SFI is received too close to an uplink transmission in a slot). Accordingly, it may be appropriate for the UE to identify a configuration of a slot using multiple SFIs. In some aspects, however, it may be challenging for the UE 115 to determine the configuration of one or more slots based on multiple SFIs. Further, it may be additionally challenging for the UE to determine the configuration of one or more slots if the UE 115 fails to detect an SFI in a control channel. In such aspects, if the UE is unable to determine the configuration of one or more slots based on multiple SFIs, the UE may not be able to determine whether to cancel an uplink transmission, which may result in interference in a wireless communications system.

As described herein, a wireless communications system may support efficient techniques for configuring a UE to determine a configuration of one or more slots based on detected SFIs and/or undetected SFIs identified in multiple control channels. The UE may then determine whether to transmit or cancel transmission of RRC configured uplink signals in a slot based on the determined configuration. For example, if the UE identifies that at least one SFI is detected in a control channel with a range that includes the slot in which the UE is configured to transmit RRC configured uplink signals, the UE may determine the configuration of the slot based on the at least one SFI, and the UE may determine whether to transmit the RRC configured uplink signals based on the determined configuration. Alternatively, if the UE identifies that no SFIs are detected in the control channels with a range that includes the slot in which the UE is configured to transmit RRC configured uplink signals, the UE may determine the configuration of the slot based on the undetected SFIs (if any), and the UE may determine whether to transmit the RRC configured uplink signals based on the determined configuration.

Aspects of the disclosure introduced above are described below in the context of a wireless communications system. Examples of processes and signaling exchanges that support a cancellation policy for RRC configured uplink transmissions are then described. Aspects of the disclosure are further illustrated by and described with reference to apparatus diagrams, system diagrams, and flowcharts that relate to a cancellation policy for RRC configured uplink transmissions.

FIG. 1 illustrates an example of a wireless communications system 100 that supports a cancellation policy for RRC configured uplink transmissions in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)) or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than ultra-high frequency (UHF) antennas. In some cases, this may facilitate the use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Wireless communications system 100 may support techniques for dynamically configuring resources for uplink communication or downlink communication between a base station 105 and a UE 115 to improve the flexibility of the system. For instance, a base station 105 may configure a slot as an uplink slot, downlink slot, or flexible slot (e.g., where a flexible slot may be used for either uplink or downlink communications). Specifically, the base station 105 may transmit an SFI to a UE 115 to indicate the configuration of the slot. The UE 115 may receive the SFI and determine the configuration of the slot prior to communicating in the slot. In some cases, however, a UE 115 may be scheduled to transmit uplink signals in a slot before the slot is configured as uplink, downlink, or flexible (i.e., via the SFI). For example, the UE 115 may be configured to transmit RRC configured uplink signals (e.g., a scheduling request, sounding reference signals (SRSs), uplink signals scheduled using semi-persistent scheduling (SPS), etc.) in a slot before the slot is configured as uplink, downlink, or flexible. In such cases, in order to prevent interference between the uplink transmission and a downlink transmission, the UE 115 may be configured to cancel an uplink transmission in a slot when the UE 115 determines that the slot is configured as a downlink slot or a flexible slot.

Specifically, the UE 115 may determine the configuration of a slot before transmitting uplink signals in the slot (e.g., based on an SFI received from base station 105), and the UE 115 may determine whether to transmit or cancel transmission of the uplink signals in the slot based on the determined configuration. Using these techniques, the UE 115 may avoid transmitting uplink signals in a slot used for a downlink transmission (e.g., in a flexible or downlink slot). In some cases, however, though a UE 115 may receive an SFI indicating the configuration of a slot prior to the slot, the UE 115 may not be able to determine the configuration of the slot before an uplink transmission in the slot. For example, the UE 115 may not be able to finish processing the SFI before an uplink transmission in the slot. In such cases, the UE 115 may not be able to determine whether to transmit or cancel transmission of uplink signals in the slot, which may be result in interference in a wireless communications system. As such, in wireless communications system 100, a UE 115 may be configured to cancel a transmission of uplink signals in a slot based on an SFI only after a threshold amount of time has elapsed after receiving the SFI (e.g., N2 symbols, which may correspond to a same timeline as the PUSCH). Techniques for canceling uplink transmissions are described further with respect to FIGS. 2A and 2B.

Figure 2A:
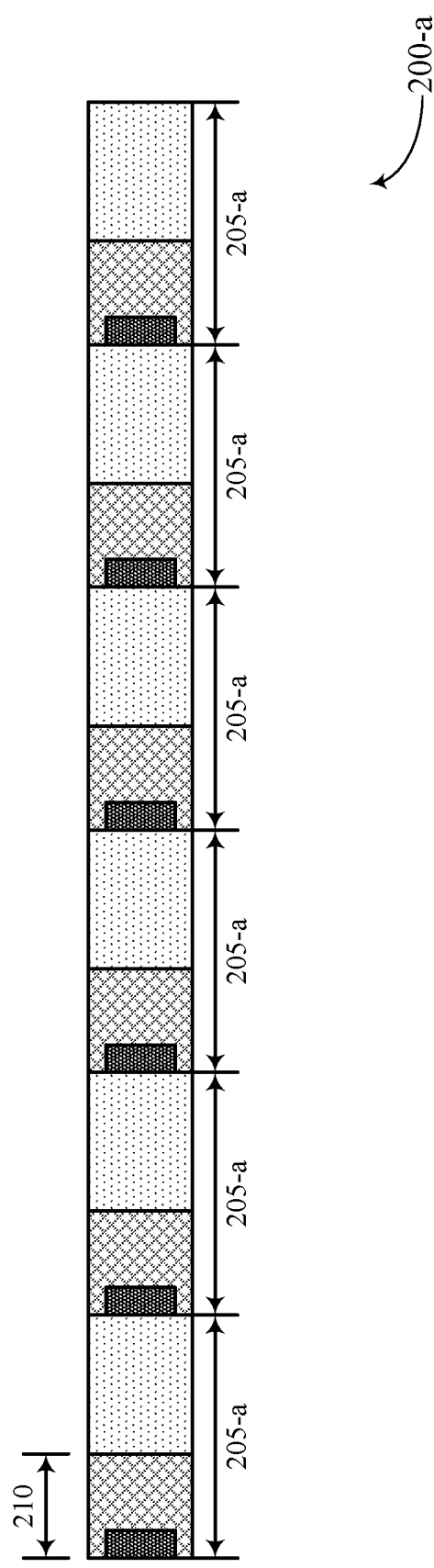
FIGS. 2A and 2B illustrate examples of slots carrying slot format indications (SFIs) in accordance with aspects of the present disclosure.

In the example of FIG. 2A, a UE 115 may receive SFIs 215 in slots 200-*a* from a base station 105, where each SFI may indicate the format of slots within a range 205-*a*, and each range 205-*a* may not overlap with the range 205-*a* of another SFI. In this example, because the ranges of SFIs 215 may not overlap, and the UE 115 may not cancel uplink transmissions in a slot until after a threshold amount of time 210 has elapsed after receiving the SFI 215, UE 115 may not be able to cancel uplink transmissions in a portion of each slot (e.g., during no cancellation period 220). As a result, if a slot is scheduled for a downlink transmission, the uplink transmission in the no cancellation period 220 of the slot may interfere with the downlink transmission, which may result in interference in a wireless communications system. Accordingly, as described herein, a base station 105 may transmit SFIs with overlapping ranges to a UE 115 to eliminate no cancellation periods 220.

Figure 2B:
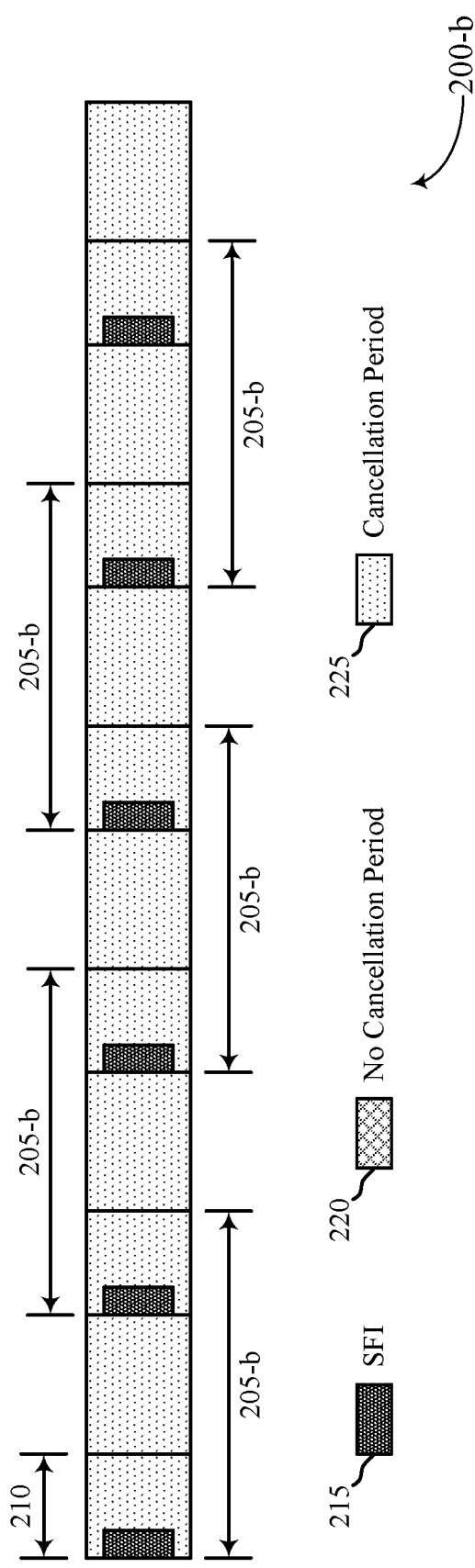

In the example of FIG. 2B, a UE 115 may receive SFIs 215 in slots 200-*b* from a base station 105, where each SFI may indicate the format of slots within a range 205-*b*, and each range 205-*b* may overlap with the range 205-*b* of another SFI. In this example, because the ranges of SFIs 215 may overlap, the UE 115 may be able to cancel uplink transmissions in any portion of a slot (i.e., during cancellation period 225). As a result, the UE 115 may be able to avoid transmitting uplink signals in slots scheduled for a downlink transmission, which may limit interference and improve throughput in a wireless communications system 100. Although FIG. 2B illustrates that SFIs 215 may cover a same number (or range) of slots (i.e., may indicate the format of the same number of slots), it is to be understood that, in other examples, different SFIs 215 may cover different numbers (or ranges) of slots (i.e., may indicate the format of different numbers of slots).

Because the use of SFIs with overlapping ranges may limit interference in a wireless communications system, wireless communications system 100 may support the use of such SFIs. In particular, a base station 105 may transmit SFIs with overlapping ranges to a UE 115, and the UE 115 may determine the configuration of one or more slots based on these SFIs. In some cases, two SFIs covering overlapping ranges may indicate the same configurations for slots covered by both SFIs. In other cases, however, an SFI received after another SFI may overwrite all configurations indicated by the earlier SFI for slots covered by both SFIs or may overwrite a subset of the configurations (e.g., flexible slot configurations) indicated by the earlier SFI for slots covered by both SFIs.

In any case, when a UE 115 receives multiple SFIs in multiple control channels, it may be appropriate for the UE 115 to identify an appropriate configuration for one or more slots such that the UE 115 may be able to determine whether to transmit or cancel a transmission of uplink signals to a base station 105. In some aspects, however, it may be challenging for the UE 115 to determine the configuration of one or more slots based on multiple SFIs. Further, it may be additionally challenging for the UE to determine the configuration of one or more slots if the UE 115 fails to detect an SFI in a control channel. Wireless communications system 100 may support efficient techniques for configuring a UE 115 to determine a configuration of one or more slots based on detected SFIs and/or undetected SFIs identified in multiple control channels.

Figure 3:
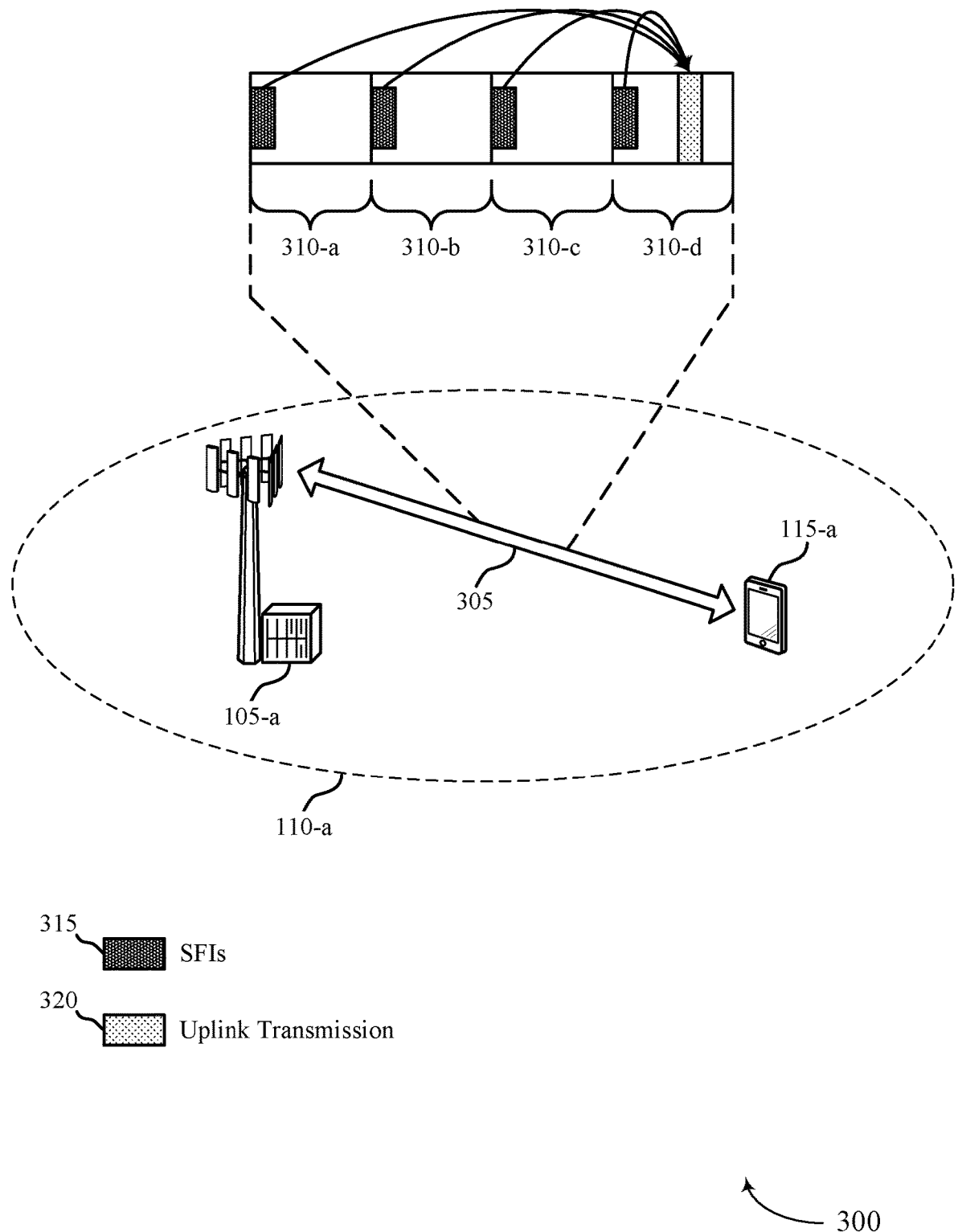
FIG. 3 illustrates an example of a wireless communications system that supports a cancellation policy for RRC configured uplink transmissions in accordance with aspects of the present disclosure.

FIG. 3 illustrates an example of a wireless communications system 300 that supports a cancellation policy for RRC configured uplink transmissions in accordance with various aspects of the present disclosure. Wireless communications system 300 includes base station 105-a and UE 115-a, which may be examples of the corresponding devices described with reference to FIGS. 1 and 2. Base station 105-a may communicate with UEs 115 (including UE 115-a) within coverage area 110-a. Wireless communications system 300 may implement aspects of wireless communications system 100. For example, wireless communications system 300 may support efficient techniques for configuring a UE 115 to determine a configuration of one or more slots based on detected SFIs and/or undetected SFIs identified in multiple control channels. Although the examples described below are related to using SFIs to indicate the configuration of one or more slots, it is to be understood that the same techniques may be applied when using any indication to indicate the configuration of any set of symbols.

In the example of FIG. 3, base station 105-a may communicate with UE 115-a on resources of a carrier 305 in slots 310. In this example, UE 115-a may be scheduled to transmit RRC configured uplink signals in an uplink transmission 320 in a slot 310-d. Thus, as discussed with reference to FIG. 1, prior to transmitting the RRC configured uplink signals, it may be appropriate for UE 115-a to determine the configuration of slot 310-d such that UE 115-a may be able to determine whether to transmit the RRC configured uplink signals or cancel transmission of the RRC configured uplink signals in slot 310-d. Accordingly, using the techniques described herein, UE 115-a may identify control channels which may be configured to include SFIs that may potentially indicate the configuration of slot 310-d, and UE 115-a may determine the configuration of slot 310-d based on the detected SFIs and/or the undetected SFIs in these control channels.

As illustrated, UE 115-a may determine that the control channels in slots 310-a through 310-d may potentially include SFIs that cover ranges that include slot 310-d. For example, UE 115-a may determine the maximum range of SFIs based on a UE-specific SFI table (e.g., saved locally at UE 115-a or otherwise accessible by UE 115-a) that indicates the different formats of different ranges of slots that correspond to different SFIs, and UE 115-a may determine whether a control channel includes an SFI that may potentially cover a range that includes slot 310-d based on the maximum range of SFIs (e.g., assuming the SFI in a control channel covers the maximum range of slots). UE 115-a may then monitor the identified control channels for SFIs from base station 105-a, attempt to detect an SFI in each of the control channels, and determine the configuration of slot 310-d based on the detected SFIs, undetected SFIs, or a combination of the detected and undetected SFIs in the control channels.

If UE 115-a detects an SFI in a control channel of a slot 310 within a threshold period of time prior to slot 310-d, UE 115-a may avoid using the SFI to determine the configuration of slot 310-d. For instance, an SFI received in slot 310-c may be received within the threshold period of time prior to slot 310-d. Thus, UE 115-a may ignore the SFI received in slot 310-c for determining the configuration of slot 310-d as the control channel in slot 310-c may be too close to slot 310-d. Subsequently, if UE 115-a determines that there are no more control channels that may include SFIs potentially covering a range that includes slot 310-d (e.g., no more control channels other than the control channel in slot 310-c which may be too close to slot 310-d), UE 115-a may determine that slot 310-d is configured as an uplink slot, and UE 115-a may transmit the RRC configured uplink signals in slot 310-d to base station 105-a. Alternatively, if UE 115-a determines that there are additional control channels (e.g., S control channels) that may include SFIs potentially covering a range that includes slot 310-d, UE 115-a may determine the configuration of slot 310-d based on the detected SFIs and/or the undetected SFIs in these control channels.

Specifically, UE 115-a may identify control channels where SFIs are detected (e.g., S1 control channels) and the control channels where SFIs are undetected (e.g., S0 control channels), and UE 115-a may determine the configuration of slot 310-d based on the detected SFIs and/or the undetected SFIs. In one example, if UE 115-a identifies at least one control channel where an SFI is detected with a range that covers slot 310-d, UE 115-a may determine the configuration of slot 310-d (e.g., uplink, downlink, or flexible) based on the SFI, and UE 115-a may determine whether to transmit the RRC configured uplink signals based on the determined configuration. That is, UE 115-a may transmit the RRC configured uplink signals when it is determined that slot 310-d is configured as uplink, and UE 115-a may cancel transmission of the RRC configured uplink signals when it is determined that slot 310-d is configured as flexible or downlink.

In another example, if UE 115-a identifies that control channels where SFIs are detected fail to include SFIs with ranges that cover slot 310-d, or if UE 115-a identifies that that there are no control channels where SFIs are detected, or a combination thereof, UE 115-a may determine the configuration of slot 310-d based on whether there are any control channels with undetected SFIs. In this example, if UE 115-a identifies that there are no control channels with undetected SFIs, UE 115-a may transmit the RRC configured uplink signals to base station 105-a. That is, UE 115-a may determine that slot 310-d is configured as an uplink slot since base station 105-a may not have attempted to configure slot 310-d as a downlink slot or a flexible slot. However, if UE 115-a identifies that there is at least one control channel with an undetected SFI, UE 115-a may cancel transmission of the RRC configured uplink signals. That is, UE 115-a may determine that slot 310-d is configured as a flexible slot (i.e., by default) since base station 105-a may have attempted to configure slot 310-d as a downlink slot or a flexible slot.

In the examples described above, SFIs 315 may be used by base station 105-*a* to indicate the configuration of one or more slots to UE 115-*a* to allow UE 115-*a* to determine whether to transmit or cancel transmission of RRC configured uplink signals in a slot. In some cases, however, in addition to being used to indicate the configuration of one or more slots, the SFIs 315 may also be used as a trigger for the transmission of RRC configured uplink signals. Specifically, in mmW deployments, an uplink transmission may be received by base station 105-*a* when base station 105-*a* is tuned to the beam used for the uplink transmission at the time of the uplink transmission. However, for uplink transmissions of RRC configured uplink signals, it may be challenging for UE 115-*a* to identify whether base station 105-*a* is tuned to an appropriate beam at the time of the uplink transmission. Specifically, because an uplink transmission of RRC configured uplink signals may be scheduled using RRC signaling (i.e., as opposed to being scheduled by an uplink grant, like DCI-based uplink transmissions), UE 115-*a* may not be able to identify whether base station 105-*a* is tuned to an appropriate beam for the uplink transmission.

Accordingly, in some aspects, a base station 105-*a* may transmit a trigger signal to UE 115-*a* to trigger an uplink transmission of RRC configured uplink signals. The trigger signal may indicate to UE 115-*a* that base station 105-*a* is tuned to an appropriate beam for receiving the RRC configured uplink signals, and UE 115-*a* may transmit the RRC uplink signals to base station 105-*a*. However, the use of a trigger signal by a base station 105-*a* for triggering uplink transmissions of RRC configured uplink signals may introduce additional overhead in a wireless communications system. Further, because the trigger signal may be unicast to each UE 115 in a wireless communications system prior to a transmission of RRC configured uplink signals from the UE 115, the overhead associated with transmitting trigger signals may be high. As described herein, in wireless communications system 300, SFIs 315 may be used as trigger signals to trigger a UE 115-*a* to transmit RRC configured uplink signals to a base station 105.

In particular, when a base station 105 transmits an SFI to indicate to a UE 115 that a slot to be used for a transmission of RRC configured uplink signals is an uplink slot, the base station 105 may tune to the beam to be used by the UE 115 to transmit the RRC configured uplink signals. Thus, a UE 115 may be able to identify when a base station 105 is tuned to an appropriate beam to receive the RRC configured uplink signals, and the UE 115 may transmit the RRC configured uplink signals to the base station 105 when the base station 105 is tuned to the appropriate beam. Accordingly, in addition to determining whether to cancel an uplink transmission of RRC configured uplink signals based on detected and/or undetected SFIs (as discussed above), the UE 115 may determine whether to cancel an uplink transmission based on identifying whether a base station 105 is tuned to an appropriate beam to receive the uplink transmission. In some cases, the base station 105 may transmit the SFI in a same control channel as a grant transmitted to another UE 115 for an uplink transmission from that UE 115. Further, the base station 105 may transmit SFIs relatively frequently (e.g., per slot) to be able to trigger uplink transmissions from a large number of UEs.

Using the techniques described above, a base station 105 may transmit an SFI to indicate the configuration of one or more slots and, in some cases, to trigger an uplink transmission of RRC configured uplink signals from a UE 115. In some aspects, however, a UE 115 may receive an SFI on a beam that was not intended for the UE 115 (e.g., the UE 115 may receive the SFI through a side lobe of a beam directed at another UE), and the UE 115 may determine to transmit RRC configured uplink signals in a slot based on receiving the SFI though the SFI was not intended for the UE 115. In such cases, the uplink transmission of the RRC configured uplink signals in the slot may interfere with another scheduled transmission in the slot (e.g., a downlink transmission). In order to prevent such cases where a UE 115 may receive an SFI intended for another UE 115, a base station 105 may use the techniques described herein to indicate an intended receiving UE.

In one example, the base station 105 may scramble an SFI using an SFI-radio network temporary identifier (RNTI) that is available to the intended receiving UEs, and a receiving UE 115 may determine whether an SFI is intended for the UE 115 based on whether the UE 115 is able to successfully descramble the SFI using an SFI configured at the UE 115. In this example, the base station 105 may configure the UE 115 with an appropriate SFI-RNTI each time the UE 115 changes the beam used to communicate with the base station 105. In another example, the base station 105 may transmit an indication of a beam associated with a transmitted SFI, and UEs 115 configured to communicate using that beam may use the SFI (e.g., to determine the configuration of one or more slots and/or as a trigger for an uplink transmission of RRC configured uplink signals). The indication may be a transmission configuration indication (TCI) that may indicate beams that may be quasi co-located with the beam used to transmit the SFI, or the indication may be some other beam indication (e.g., a beam index). Accordingly, a receiving UE 115 may determine to use a received SFI if a TCI configured at the UE is the same as the indicated TCI or if a beam used by the UE 115 to communicate with base station 105 is the same as the beam used to transmit the SFI (i.e., as indicated by the beam indication).

The indication of the beam associated with a transmitted SFI (e.g., the TCI or other beam indication) may be received in the DCI that includes the SFI or in other DCI. In some cases, the base station 105 may transmit a single indication of a beam associated with a transmitted SFI. In other cases, the base station 105 may transmit multiple indications of one or more beams associated with a transmitted SFI if, for example, the SFI is transmitted using a beam that overlaps with another beam or the SFI is transmitted using a wide beam that includes multiple narrower beams. In yet other cases, the base station 105 may transmit a unique indication (e.g., a wildcard indication) to indicate that any UE 115 that receives the SFI is to use the SFI (i.e., the SFI is intended for any receiving UE 115). Regardless of the technique used to indicate the intended receivers of an SFI, once a UE 115 receives an SFI, the UE 115 may determine whether the SFI was intended for the UE 115, and the UE 115 may use the SFI if the SFI was intended for the UE 115 and ignore the SFI if the SFI was not intended for the UE 115.

As discussed above, a UE 115 may determine whether to transmit or cancel transmission of RRC configured uplink signals based on various factors. In one example, the UE 115 may determine whether to transmit or cancel transmission of RRC configured uplink signals in a slot based on the configuration of the slot determined using detected and/or undetected SFIs in multiple control channels received from a base station 105. In another example, the UE 115 may determine whether to transmit or cancel transmission of RRC configured uplink signals in a slot based on whether the transmission is triggered by an SFI received from a base station 105. In yet another example, the UE 115 may determine whether to transmit or cancel an uplink transmission of RRC configured uplink signals in a slot based on whether an SFI that indicates the configuration of the slot is intended for the UE 115.

Figure 4:
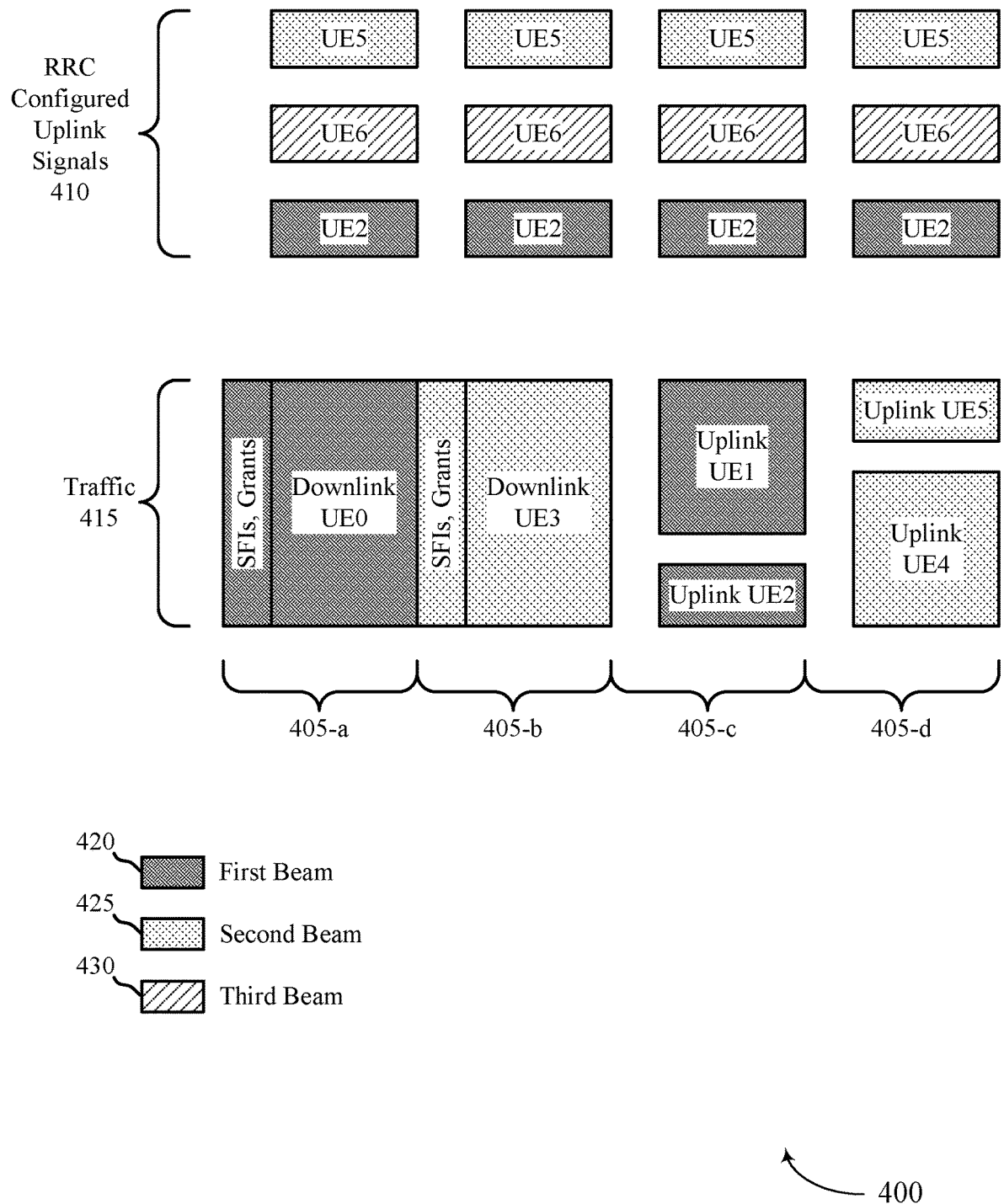
FIG. 4 illustrates an example diagram showing the decisions made by different user equipment (UE) on whether to transmit or cancel transmissions of RRC configured uplink signals in accordance with aspects of the present disclosure.

FIG. 4 illustrates an example diagram 400 showing the decisions made by different UEs on whether to transmit or cancel transmissions of RRC configured uplink signals based on the factors described above. In the example of FIG. 4, multiple UEs 115 may be configured to transmit RRC configured uplink signals 410 to a base station 105 in slots 405. However, as illustrated by traffic 415, these UEs 115 may not be able to transmit the RRC configured uplink signals 410 in every slot in which the UEs 115 may be configured to transmit the RRC configured uplink signals 410. That is, UE5, UE6, and UE2 may, in some cases, determine to cancel one or more transmissions of RRC configured uplink signals 410 in slots 405 based on the factors described above.

In one example, UE5 may be configured to transmit RRC configured uplink signals in slots 405-a through 405-d. However, UE5 may determine that slots 405-a and 405-b are configured as downlink slots (e.g., based on detected and/or undetected SFIs received in advance of slots 405-a and 405-b by a threshold amount of time). Thus, UE5 may determine to cancel the transmissions of the RRC configured uplink signals in slots 405-a and 405-b. UE5 may then detect an SFI in slot 405-a that indicates that slot 405-c is configured as an uplink slot. However, because the SFI in slot 405-a may be transmitted using a first beam 420, instead of a second beam 425 configured for communications at UE5, UE5 may not be able to determine that the base station 105 is tuned to an appropriate beam to receive the RRC configured uplink signals. Thus, UE5 may cancel transmission of the RRC configured uplink signals in slot 405-c. Subsequently, UE5 may receive an SFI in slot 405-b that indicates that slot 405-d is configured as an uplink slot. Because the SFI in slot 405-b may be transmitted using the second beam 425, UE5 may determine that the base station 105 will be tuned to the second beam 425 for receiving the RRC configured uplink signals in slot 405-d. Thus, UE5 may transmit the RRC configured uplink signals in slot 405-d.

In another example, UE2 may be configured to transmit RRC configured uplink signals in slots 405-a through 405-d. However, UE2 may determine that slots 405-a and 405-b are configured as downlink slots (e.g., based on detected and/or undetected SFIs received in advance of slots 405-a and 405-b by a threshold amount of time). Thus, UE2 may determine to cancel the transmissions of the RRC configured uplink signals in slots 405-a and 405-b. UE2 may then detect an SFI in slot 405-a that indicates that slot 405-c is configured as an uplink slot. Because the SFI in slot 405-a may be transmitted using a first beam 420, and UE2 may be configured for communications using the first beam 420, UE2 may determine that the base station 105 will be tuned to the first beam 420 for receiving the RRC configured uplink signals in slot 405-c. Thus, UE2 may transmit the RRC configured uplink signals in slot 405-c. UE2 may then detect an SFI in slot 405-b that indicates that slot 405-d is configured as an uplink slot. However, because the SFI in slot 405-b may be transmitted using a second beam 425, instead of a first beam 420 configured for communications at UE2, UE2 may not be able to determine that the base station 105 is tuned to an appropriate beam to receive the RRC configured uplink signals from UE2 in slot 405-d. Thus, UE2 may cancel transmission of the RRC configured uplink signals in slot 405-d.

In yet another example, UE6 may be configured to transmit RRC configured uplink signals in slots 405-a through 405-d. However, UE6 may determine that slots 405-a and 405-b are configured as downlink slots (e.g., based on detected and/or undetected SFIs received in advance of slots 405-a and 405-b by a threshold amount of time). Thus, UE6 may determine to cancel the transmissions of the RRC configured uplink signals in slots 405-a and 405-b. Further, although UE6 may receive SFIs in slots 405-a and 405-b that indicate that slots 405-c and 405-d are configured as uplink slots, UE6 may also cancel transmissions of the RRC configured uplink signals in slots 405-c and 405-d because none of the SFIs received in slots 405-a and 405-b may be received on third beam 430, which may be the beam configured for communications with a base station 105 at UE6. Although FIG. 4 illustrates that the UE2, UE5, and UE6 may be configured to transmit RRC configured uplink signals in the same slots 405 on non-overlapping resources, it is to be understood that different UEs may also be configured to transmit RRC configured uplink signals in time-varying and overlapping allocations.

Figure 5:
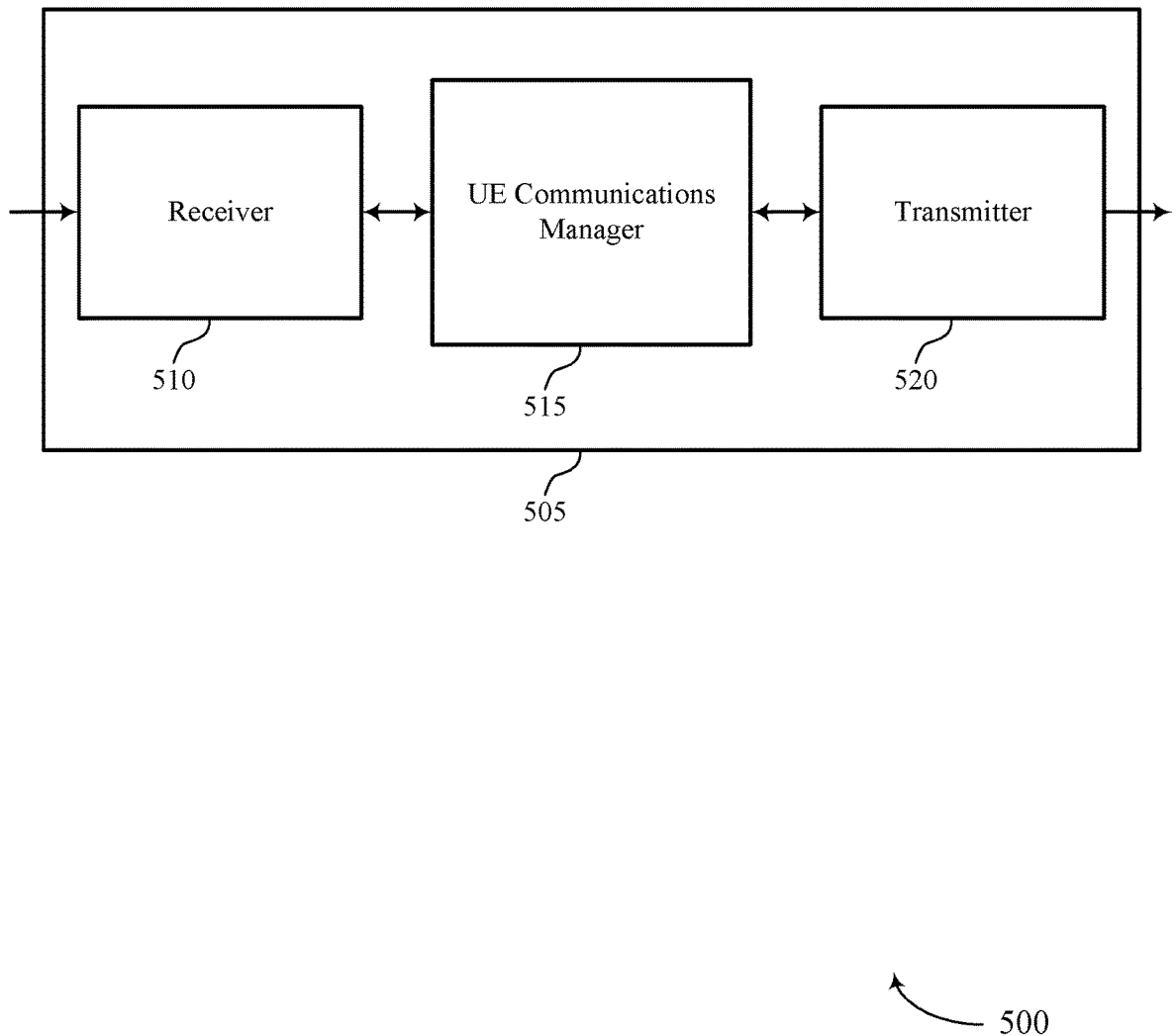
FIGS. 5-7 show block diagrams of a device that supports a cancellation policy for RRC configured uplink transmissions in accordance with aspects of the present disclosure.

FIG. 5 shows a block diagram 500 of a wireless device 505 that supports a cancellation policy for RRC configured uplink transmissions in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to cancellation policy for RRC configured uplink transmissions, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a set of control channels, where each control channel is configured to include an SFI for one or more slots, identify the control channels where the SFI is detected and the control channels where the SFI is undetected, identify a set of symbols in a slot to transmit RRC configured uplink signals to a base station, determine whether the set of symbols in the slot is configured as uplink, flexible, or downlink based on the detected SFIs, the undetected SFIs, or a combination thereof, transmit the RRC configured uplink signals when it is determined that the set of symbols in the slot is configured as uplink, and cancel transmission of the RRC configured uplink signals when it is determined that the set of symbols in the slot is configured as flexible or downlink. The UE communications manager 515 may also receive a slot format indication (SFI) for one or more slots in a control channel from a base station, determine whether the SFI is intended for the UE, determine a configuration of the one or more slots based on determining whether the SFI is intended for the UE, and communicate in the one or more slots based on the determined configuration.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
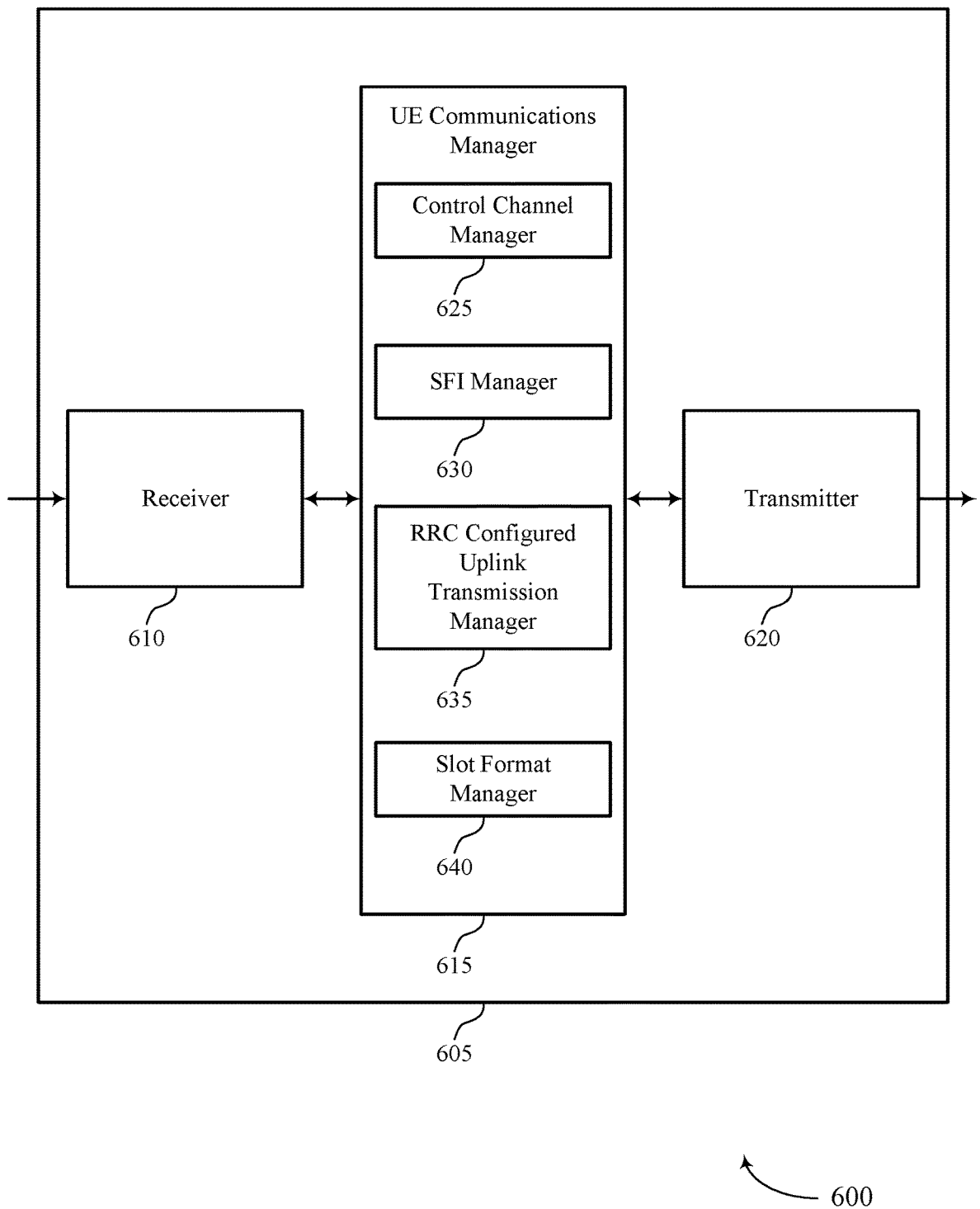

FIG. 6 shows a block diagram 600 of a wireless device 605 that supports a cancellation policy for RRC configured uplink transmissions in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. UE communications manager 615 may be an example of aspects of the UE communications manager 815 described with reference to FIG. 8. UE communications manager 615 may also include control channel manager 625, SFI manager 630, RRC configured uplink transmission manager 635, and slot format manager 640. Wireless device 605 may also include a processor. Each of these components may be in communication with one another (e.g., via one or more buses).

Receiver 610 may receive information such as packets, user data, or control information associated with various information channels (e.g., control channels, data channels, and information related to cancellation policy for RRC configured uplink transmissions, etc.). Information may be passed on to other components of the device. The receiver 610 may be an example of aspects of the transceiver 835 described with reference to FIG. 8. The receiver 610 may utilize a single antenna or a set of antennas.

Control channel manager 625 may identify a set of control channels, where each control channel is configured to include an SFI for one or more slots. SFI manager 630 may identify the control channels where the SFI is detected and the control channels where the SFI is undetected. RRC configured uplink transmission manager 635 may identify a set of symbols in a slot to transmit RRC configured uplink signals to a base station. Slot format manager 640 may determine whether the set of symbols in the slot is configured as uplink, flexible, or downlink based on the detected SFIs, the undetected SFIs, or a combination thereof. RRC configured uplink transmission manager 635 may transmit the RRC configured uplink signals when it is determined that the set of symbols in the slot is configured as uplink, and RRC configured uplink transmission manager 635 may cancel transmission of the RRC configured uplink signals when it is determined that the set of symbols in the slot is configured as flexible or downlink.

In addition, SFI manager 630 may receive an SFI for one or more slots in a control channel from a base station and determine whether the SFI is intended for wireless device 605. Slot format manager 640 may determine a configuration of the one or more slots based on determining whether the SFI is intended for the UE. UE communications manager 615 may then communicate in the one or more slots based on the determined configuration.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
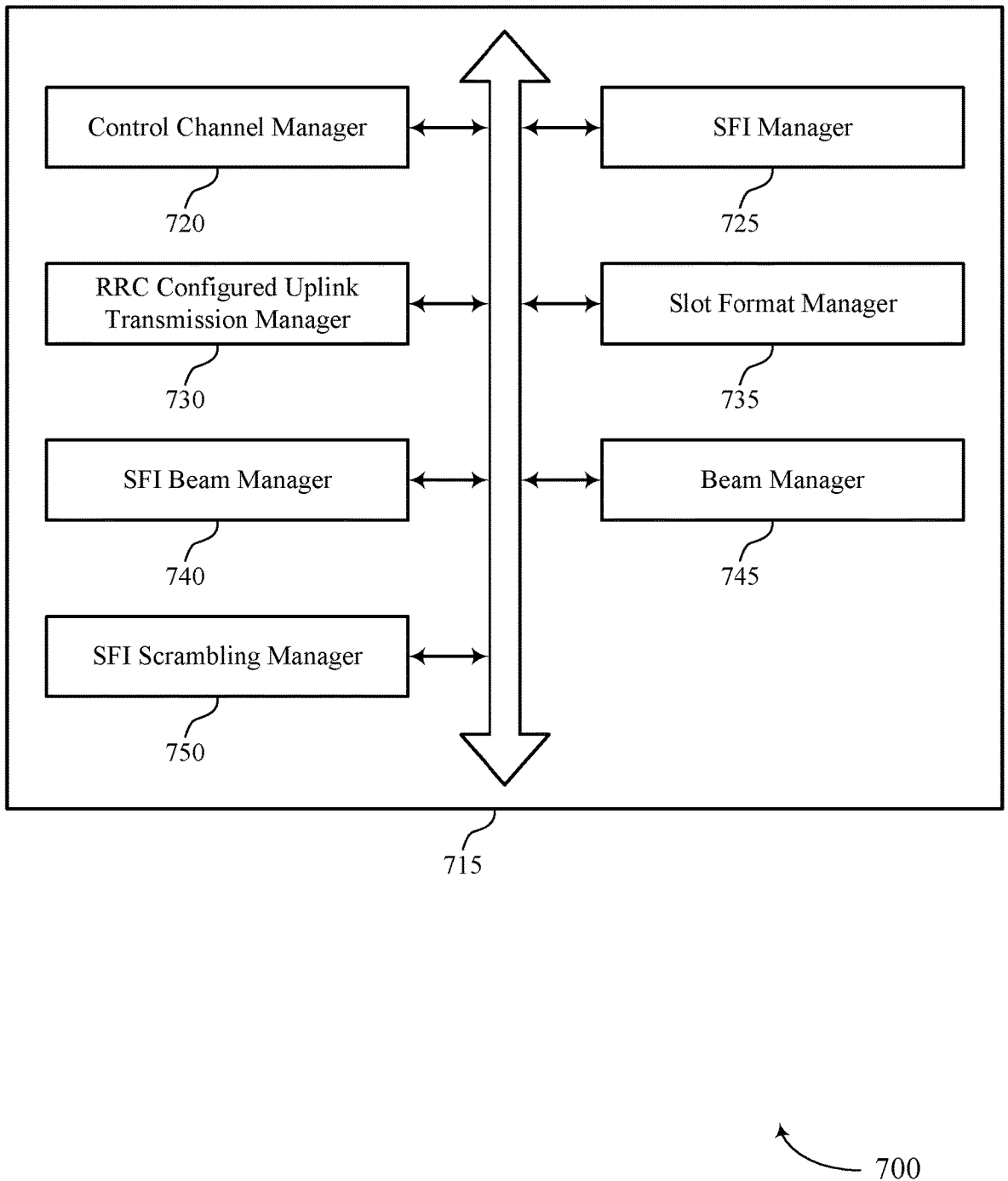

FIG. 7 shows a block diagram 700 of a UE communications manager 715 that supports a cancellation policy for RRC configured uplink transmissions in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include control channel manager 720, SFI manager 725, RRC configured uplink transmission manager 730, slot format manager 735, SFI beam manager 740, beam manager 745, and SFI scrambling manager 750. Each of these modules may communicate, directly or indirectly, with one another (e.g., via one or more buses).

Control channel manager 720 may identify a set of control channels, where each control channel is configured to include an SFI for one or more slots. In some cases, each control channel is configured to include an SFI indicating the slot formats for one or more slots with a range that potentially includes the set of symbols in the slot. In some cases, the set of control channels is identified based on a maximum range of SFIs. In some cases, the maximum range of SFIs is determined based on a look-up table that indicates the relationship between SFIs and slot formats for ranges of slots. SFI manager 725 may identify the control channels where the SFI is detected and the control channels where the SFI is undetected.

RRC configured uplink transmission manager 730 may identify a set of symbols in a slot to transmit RRC configured uplink signals to a base station. Slot format manager 735 may determine whether the set of symbols in the slot is configured as uplink, flexible, or downlink based on the detected SFIs, the undetected SFIs, or a combination thereof RRC configured uplink transmission manager 730 may then transmit the RRC configured uplink signals when it is determined that the set of symbols in the slot is configured as uplink, and RRC configured uplink transmission manager 730 may cancel transmission of the RRC configured uplink signals when it is determined that the set of symbols in the slot is configured as flexible or downlink. In some cases, the RRC configured uplink signals include a SR, SRSs, uplink signals scheduled using SPS, or a combination thereof.

In some cases, SFI manager 725 may identify at least one control channel of the set of control channels where an SFI with a range that includes the set of symbols in the slot is detected. In some cases, SFI manager 725 may determine that the SFI is detected in the at least one control channel in advance of the set of symbols in the slot by a threshold amount of time, and slot format manager 735 may determine whether the set of symbols in the slot is configured as uplink, flexible, or downlink based on the SFI. In some cases, SFI manager 725 may determine that the SFI is detected in the at least one control channel within a threshold amount of time prior to the set of symbols in the slot, and slot format manager 735 may determine whether the set of symbols in the slot is configured as uplink, flexible, or downlink independent of the SFI.

In some cases, SFI manager 725 may identify that at least one SFI is detected in the control channels, where the detected at least one SFI fails to cover a range that includes the set of symbols, and that at least one SFI is undetected in the control channels. In such cases, slot format manager 735 may determine that the slot is configured as flexible based on the identifying, and RRC configured uplink transmission manager 730 may cancel transmission of the RRC configured uplink signals based on the determination. In some cases, SFI manager 725 may identify that at least one SFI is detected in the control channels, where the detected at least one SFI fails to cover a range that includes the set of symbols, and that no SFIs are undetected in the control channels. In such cases, slot format manager 735 may determine that the slot is configured as uplink based on the identifying, and RRC configured uplink transmission manager 730 may transmit the RRC configured uplink signals based on the determination.

In some cases, SFI manager 725 may identify that no SFIs are detected in the control channels and that at least one SFI is undetected in the control channels. In such cases, slot format manager 735 may determine that the slot is configured as flexible based on the identifying, and RRC configured uplink transmission manager 730 may cancel transmission of the RRC configured uplink signals based on the determination. In some cases, SFI manager 725 may identify that no SFIs are detected in the control channels and that no SFIs are undetected in the control channels. In such cases, slot format manager 735 may determine that the slot is configured as uplink based on the identifying, and RRC configured uplink transmission manager 730 may transmit the RRC configured uplink signals based on the determination.

SFI manager 725 may receive an SFI for one or more slots in a control channel from a base station and determine whether the SFI is intended for the UE. Slot format manager 735 may determine a configuration of the one or more slots based on determining whether the SFI is intended for the UE. UE communications manager 715 may then communicate in the one or more slots based on the determined configuration. In some cases, slot format manager 735 may determine the configuration of the one or more slots based on the SFI when the SFI is intended for the UE, and slot format manager 735 may determine the configuration of the one or more slots independent of the SFI when the SFI is not intended for the UE.

In some cases, SFI beam manager 740 may receive one or more indications of at least one beam associated with the received SFI. In some cases, beam manager 745 may determine whether the at least one beam includes a beam used for communication between the UE and the base station. SFI manager 725 may then determine whether the SFI is intended for the UE based on determining whether the at least one beam includes the beam used for communication between the UE and the base station. In some cases, the one or more indications include TCIs or beam index indications.

In some cases, the one or more indications are received in DCI that includes the SFI or in other DCI.

In some cases, SFI manager 725 may receive an indication that the SFI is intended for any receiving UE, and SFI manager 725 may determine that the SFI is intended for the UE based on receiving the SFI. In some cases, SFI scrambling manager 750 may descramble the SFI using an SFI-specific RNTI configured at the UE, where the configuration of the one or more slots is determined based on the SFI. In other cases, SFI scrambling manager 750 may fail to descramble the SFI using an SFI-specific RNTI configured at the UE, where the configuration of the one or more slots is determined based on the SFI.

Figure 8:
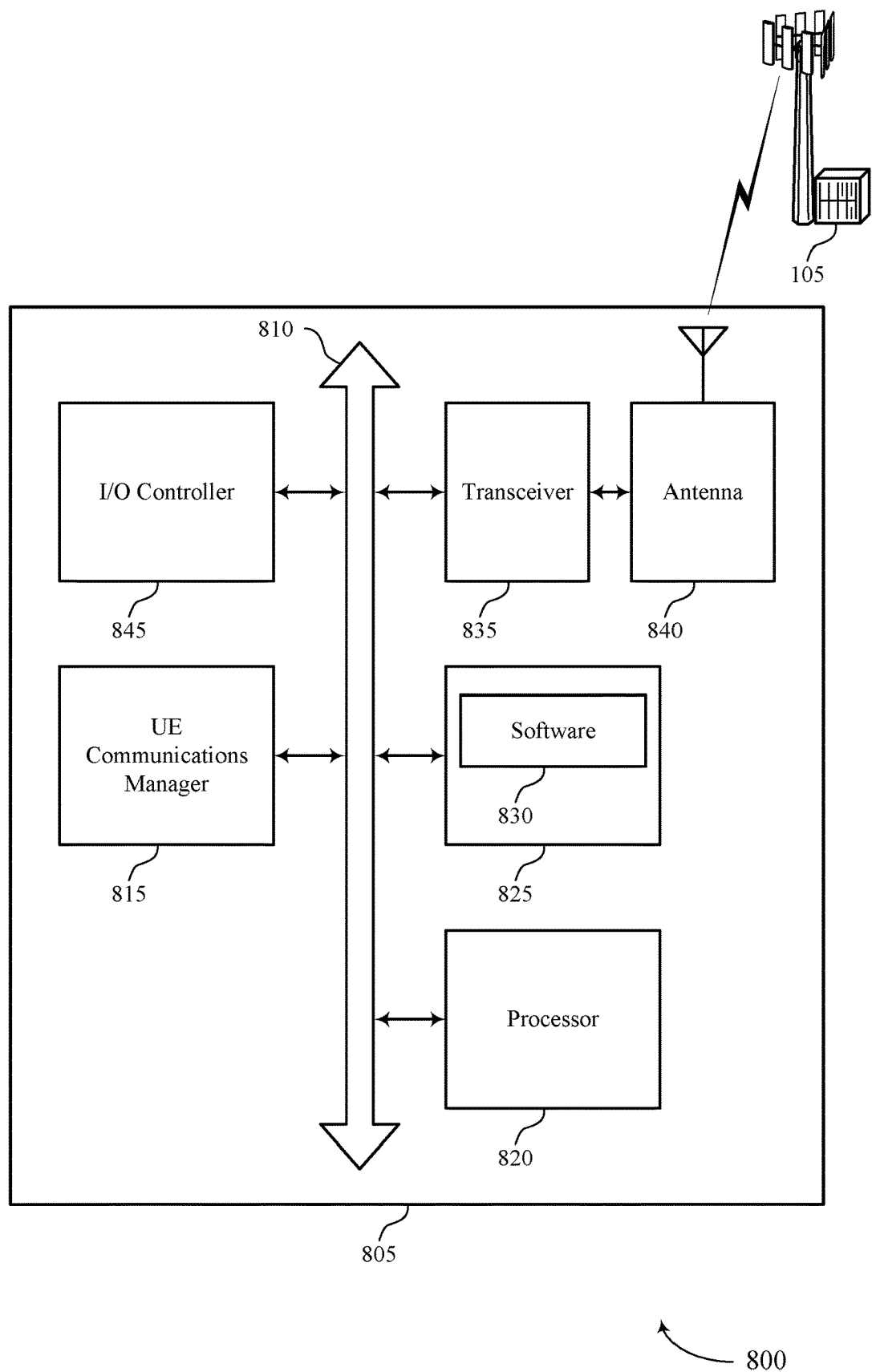
FIG. 8 illustrates a block diagram of a system including a UE that supports a cancellation policy for RRC configured uplink transmissions in accordance with aspects of the present disclosure.

FIG. 8 shows a diagram of a system 800 including a device 805 that supports a cancellation policy for RRC configured uplink transmissions in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting cancellation policy for RRC configured uplink transmissions).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support cancellation policy for RRC configured uplink transmissions. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
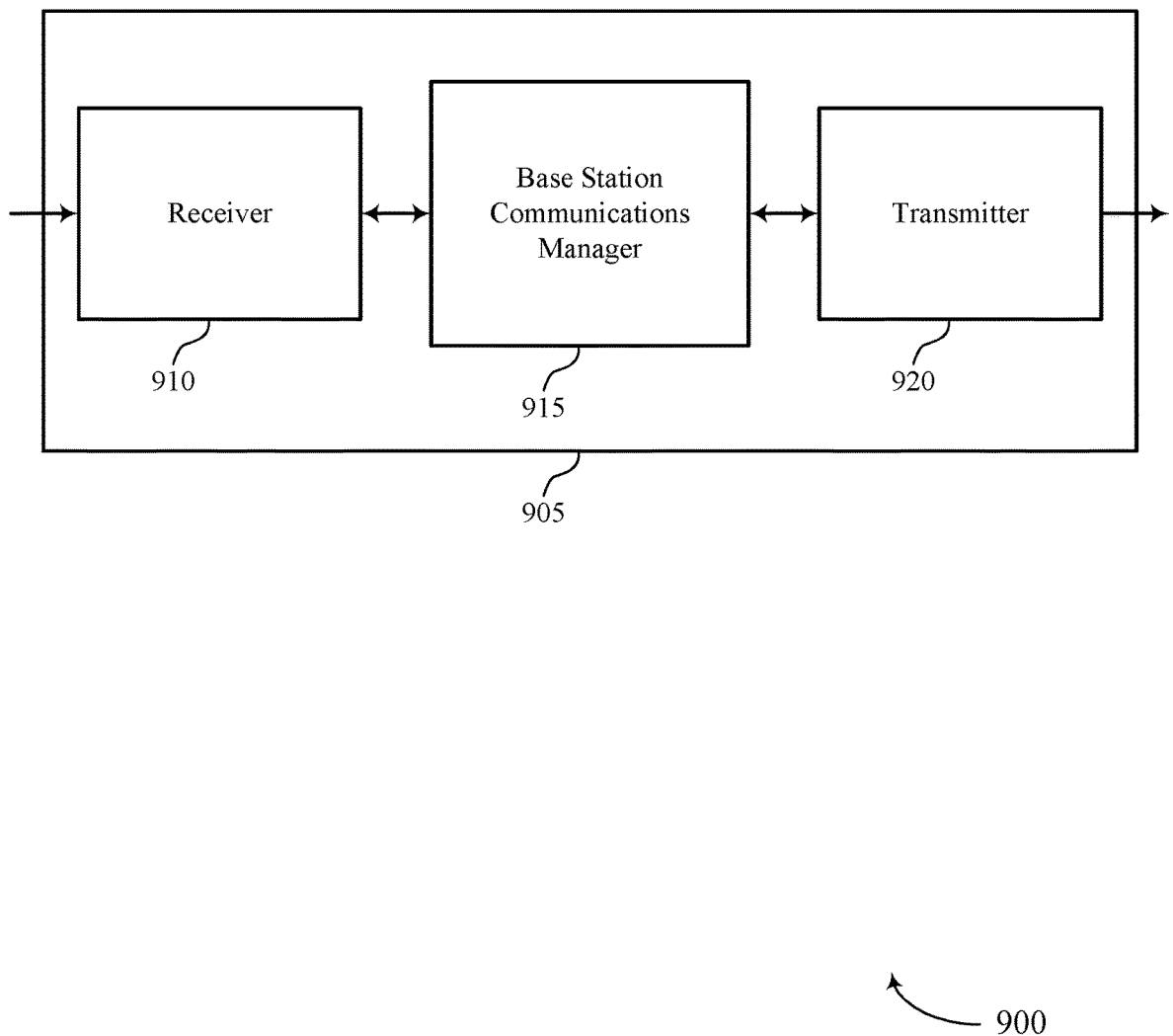
FIGS. 9 and 10 show block diagrams of a device that supports a cancellation policy for RRC configured uplink transmissions in accordance with aspects of the present disclosure.

FIG. 9 shows a block diagram 900 of a wireless device 905 that supports a cancellation policy for RRC configured uplink transmissions in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to cancellation policy for RRC configured uplink transmissions, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a configuration of one or more slots to be used for communication with one or more UEs, transmit an SFI for the one or more slots in a control channel intended for the one or more UEs based on the identifying, and communicate in the one or more slots with the one or more UEs based on the transmitting.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
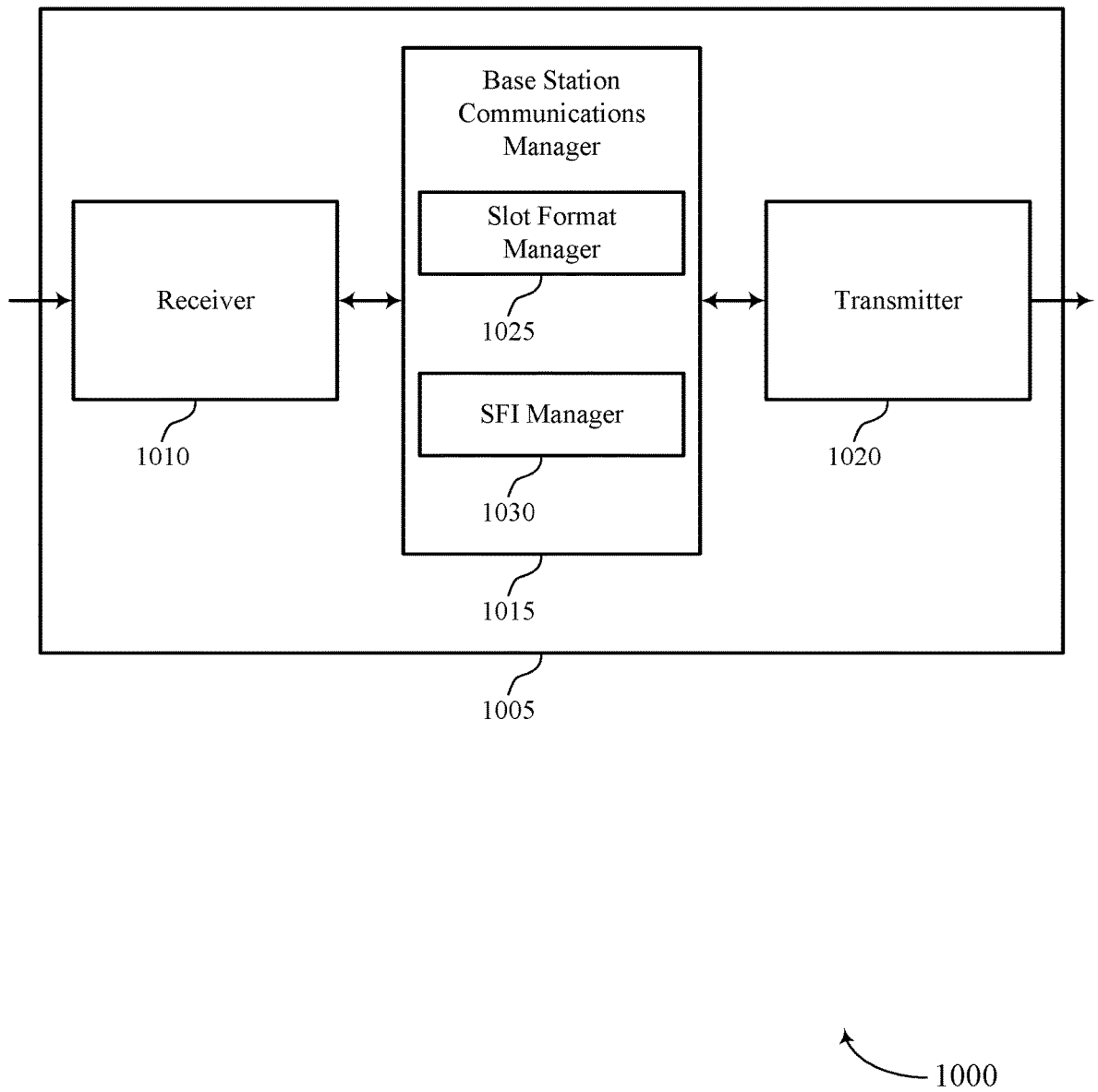

FIG. 10 shows a block diagram 1000 of a wireless device 1005 that supports a cancellation policy for RRC configured uplink transmissions in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Base station communications manager 1015 may be an example of aspects of the base station communications manager 1115 described with reference to FIG. 11. Base station communications manager 1015 may also include slot format manager 1025 and SFI manager 1030. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to cancellation policy for RRC configured uplink transmissions, etc.). Information may be passed on to other components of the device. The receiver 1010 may be an example of aspects of the transceiver 1135 described with reference to FIG. 11. The receiver 1010 may utilize a single antenna or a set of antennas.

Slot format manager 1025 may identify a configuration of one or more slots to be used for communication with one or more UEs. SFI manager 1030 may transmit an SFI for the one or more slots in a control channel intended for the one or more UEs based on the identifying. Base station communications manager 1015 may then communicate in the one or more slots with the one or more UEs based on the transmitting. In some cases, SFI manager 1030 may transmit one or more indications of at least one beam associated with the SFI, where the at least one beam includes one or more beams used for communication between the base station and the one or more UEs. In some cases, the one or more indications include TCIs or beam index indications. In some cases, the one or more indications are transmitted in DCI that includes the SFI or in other DCI. In some cases, SFI manager 1030 may transmit an indication that the SFI is intended for any receiving UE. In some cases, SFI manager 1030 may scramble the SFI using an SFI-specific RNTI configured at the one or more UEs and transmit the scrambled SFI to the one or more UEs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1135 described with reference to FIG. 11. The transmitter 1020 may utilize a single antenna or a set of antennas.

Figure 11:
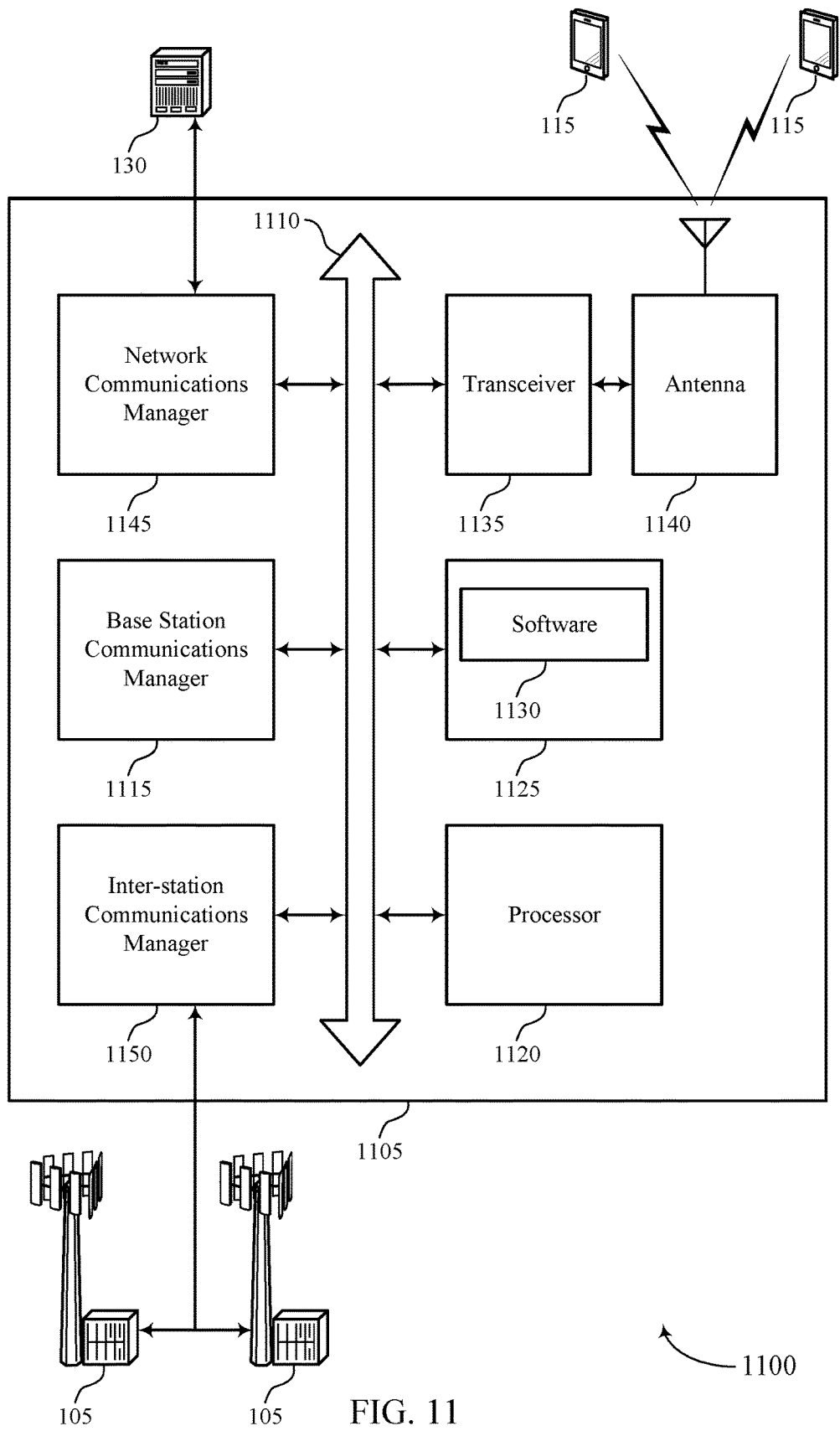
FIG. 11 illustrates a block diagram of a system including a base station that supports a cancellation policy for RRC configured uplink transmissions in accordance with aspects of the present disclosure.

FIG. 11 shows a diagram of a system 1100 including a device 1105 that supports a cancellation policy for RRC configured uplink transmissions in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting cancellation policy for RRC configured uplink transmissions).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support cancellation policy for RRC configured uplink transmissions. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105 and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
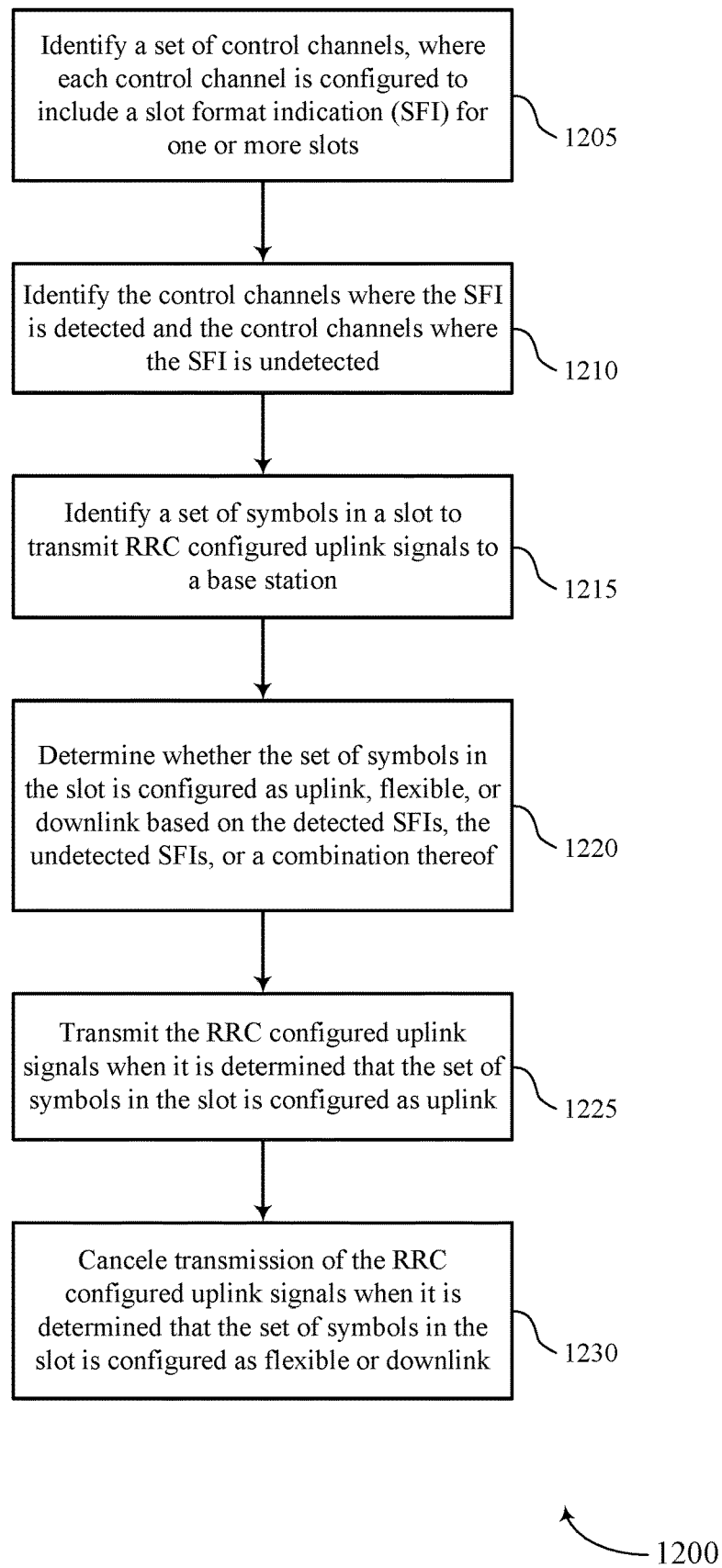
FIGS. 12-14 illustrate methods for operating in accordance with a cancellation policy for RRC configured uplink transmissions in accordance with aspects of the present disclosure.

FIG. 12 shows a flowchart illustrating a method 1200 for operating in accordance with a cancellation policy for RRC configured uplink transmissions in accordance with aspects of the present disclosure. The operations of method 1200 may be implemented by a UE 115 or its components as described herein. For example, the operations of method 1200 may be performed by a UE communications manager as described with reference to FIGS. 5 through 8. In some examples, a UE 115 may execute a set of codes to control the functional elements of the device to perform the functions described below. Additionally, or alternatively, the UE 115 may perform aspects of the functions described below using special-purpose hardware.

At 1205 the UE 115 may identify a plurality of control channels, wherein each control channel is configured to include an SFI for one or more slots. The operations of 1205 may be performed according to the methods described herein. In certain examples, aspects of the operations of 1205 may be performed by a control channel manager as described with reference to FIGS. 5 through 8.

At 1210 the UE 115 may identify the control channels where the SFI is detected and the control channels where the SFI is undetected. The operations of 1210 may be performed according to the methods described herein. In certain examples, aspects of the operations of 1210 may be performed by an SFI manager as described with reference to FIGS. 5 through 8.

At 1215 the UE 115 may identify a set of symbols in a slot to transmit RRC configured uplink signals to a base station. The operations of 1215 may be performed according to the methods described herein. In certain examples, aspects of the operations of 1215 may be performed by an RRC configured uplink transmission manager as described with reference to FIGS. 5 through 8.

At 1220 the UE 115 may determine whether the set of symbols in the slot is configured as uplink, flexible, or downlink based at least in part on the detected SFIs, the undetected SFIs, or a combination thereof. The operations of 1220 may be performed according to the methods described herein. In certain examples, aspects of the operations of 1220 may be performed by a slot format manager as described with reference to FIGS. 5 through 8.

At 1225 the UE 115 may transmit the RRC configured uplink signals when it is determined that the set of symbols in the slot is configured as uplink. The operations of 1225 may be performed according to the methods described herein. In certain examples, aspects of the operations of 1225 may be performed by an RRC configured uplink transmission manager as described with reference to FIGS. 5 through 8.

At 1230 the UE 115 may cancel transmission of the RRC configured uplink signals when it is determined that the set of symbols in the slot is configured as flexible or downlink. The operations of 1230 may be performed according to the methods described herein. In certain examples, aspects of the operations of 1230 may be performed by an RRC configured uplink transmission manager as described with reference to FIGS. 5 through 8.

Figure 13:
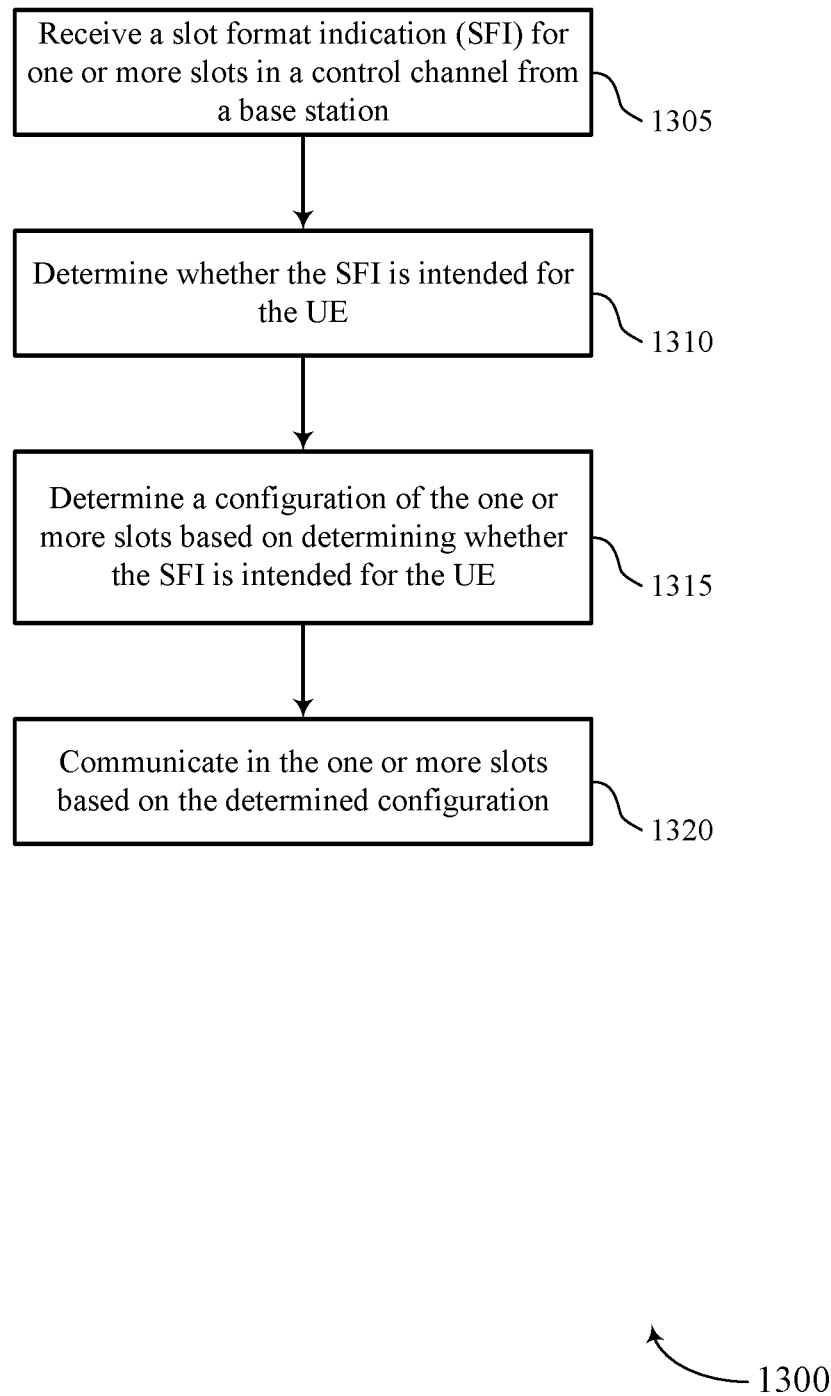

FIG. 13 shows a flowchart illustrating a method 1300 for operating in accordance with a cancellation policy for RRC configured uplink transmissions in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally, or alternatively, the UE 115 may perform aspects of the functions described below using special-purpose hardware.

At 1305 the UE 115 may receive an SFI for one or more slots in a control channel from a base station. The operations of 1305 may be performed according to the methods described herein. In certain examples, aspects of the operations of 1305 may be performed by an SFI manager as described with reference to FIGS. 5 through 8.

At 1310 the UE 115 may determine whether the SFI is intended for the UE. The operations of 1310 may be performed according to the methods described herein. In certain examples, aspects of the operations of 1310 may be performed by an SFI manager as described with reference to FIGS. 5 through 8.

At 1315 the UE 115 may determine a configuration of the one or more slots based at least in part on determining whether the SFI is intended for the UE. The operations of 1315 may be performed according to the methods described herein. In certain examples, aspects of the operations of 1315 may be performed by a slot format manager as described with reference to FIGS. 5 through 8.

At 1320 the UE 115 may communicate in the one or more slots based at least in part on the determined configuration. The operations of 1320 may be performed according to the methods described herein. In certain examples, aspects of the operations of 1320 may be performed by a transmitter as described with reference to FIGS. 5 through 8.

Figure 14:
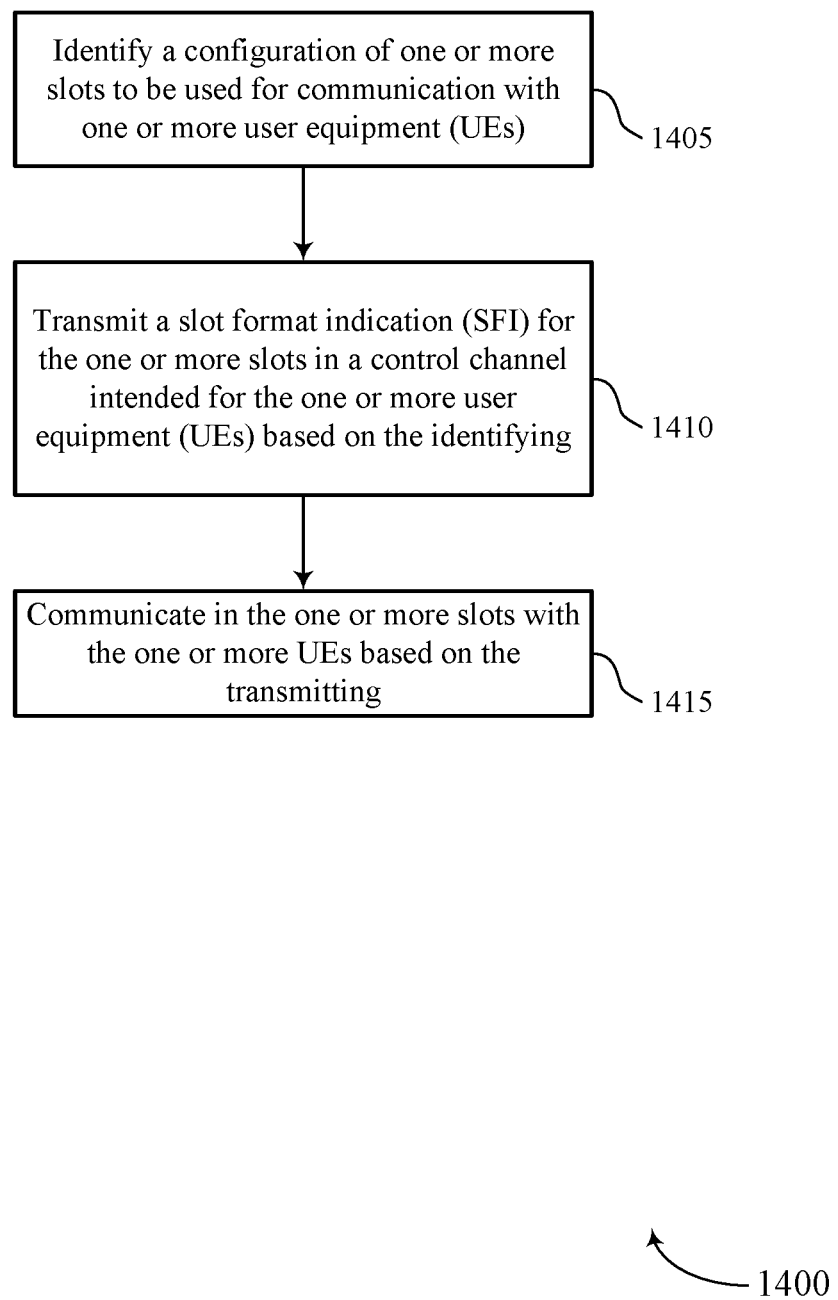

FIG. 14 shows a flowchart illustrating a method 1400 for operating in accordance with a cancellation policy for RRC configured uplink transmissions in accordance with aspects of the present disclosure. The operations of method 1400 may be implemented by a base station 105 or its components as described herein. For example, the operations of method 1400 may be performed by a base station communications manager as described with reference to FIGS. 9 through 11. In some examples, a base station 105 may execute a set of codes to control the functional elements of the device to perform the functions described below. Additionally, or alternatively, the base station 105 may perform aspects of the functions described below using special-purpose hardware.

At 1405 the base station 105 may identify a configuration of one or more slots to be used for communication with one or more UEs. The operations of 1405 may be performed according to the methods described herein. In certain examples, aspects of the operations of 1405 may be performed by a slot format manager as described with reference to FIGS. 9 through 11.

At 1410 the base station 105 may transmit an SFI for the one or more slots in a control channel intended for the one or more UEs based at least in part on the identifying. The operations of 1410 may be performed according to the methods described herein. In certain examples, aspects of the operations of 1410 may be performed by an SFI manager as described with reference to FIGS. 9 through 11.

At 1415 the base station 105 may communicate in the one or more slots with the one or more UEs based at least in part on the transmitting. The operations of 1415 may be performed according to the methods described herein. In certain examples, aspects of the operations of 1415 may be performed by a transmitter as described with reference to FIGS. 9 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring a plurality of control channels, wherein each control channel of the plurality of control channels is configured to include a slot format indication (SFI) for one or more slots;

detecting at least one SFI on at least one control channel of the plurality of control channels;

identifying a set of symbols in a slot to transmit radio resource control (RRC) configured uplink signals to a network entity;

determining whether the set of symbols in the slot is configured as uplink, flexible, or downlink based at least in part on the detected at least one SFI on the at least one control channel of the plurality of control channels;

transmitting the RRC configured uplink signals when it is determined that the set of symbols in the slot is configured as uplink; and canceling transmission of the RRC configured uplink signals when it is determined that the set of symbols in the slot is configured as flexible or downlink.

2. The method of claim 1, wherein detecting the SFI on at least one control channel of the plurality of control channels comprises:

identifying at least one control channel of the plurality of control channels where an SFI with a range that includes the set of symbols in the slot is detected.

3. The method of claim 2, further comprising:

determining that the SFI is detected in the at least one control channel in advance of the set of symbols in the slot by a threshold amount of time; and determining whether the set of symbols in the slot is configured as uplink, flexible, or downlink based at least in part on the SFI.

4. The method of claim 2, further comprising:

determining that the SFI is detected in the at least one control channel within a threshold amount of time prior to the set of symbols in the slot; and determining whether the set of symbols in the slot is configured as uplink, flexible, or downlink independently of the SFI.

5. The method of claim 1, wherein detecting the SFI on at least one control channel of the plurality of control channels comprises:

identifying that at least one SFI is detected in at least one of the plurality of control channels, wherein the detected at least one SFI fails to cover a range that includes the set of symbols, and that at least one SFI is undetected in at least one of the plurality of control channels;

determining that the slot is configured as flexible based at least in part on the identifying; and canceling transmission of the RRC configured uplink signals based at least in part on the determination.

6. The method of claim 1, wherein detecting the SFI on at least one control channel of the plurality of control channels comprises:

identifying that at least one SFI is detected in at least one of the plurality of control channels, wherein the detected at least one SFI fails to cover a range that includes the set of symbols, and that no SFIs are undetected in the plurality of control channels;

determining that the slot is configured as uplink based at least in part on the identifying; and transmitting the RRC configured uplink signals based at least in part on the determination.

7. The method of claim 1, wherein each control channel of the plurality of control channels is configured to include an SFI indicating slot formats for one or more slots with a range that potentially includes the set of symbols in the slot.

8. The method of claim 7, wherein the plurality of control channels is identified based at least in part on a maximum range of SFIs.

9. The method of claim 8, wherein the maximum range of SFIs is determined based at least in part on a look-up table that indicates a relationship between SFIs and slot formats for ranges of slots.

10. The method of claim 1, wherein the RRC configured uplink signals comprise a scheduling request (SR), sounding reference signals (SRSs), uplink signals scheduled using semi-persistent scheduling (SPS), or a combination thereof.

11. An apparatus for wireless communication at a user equipment (UE), comprising:

a memory; and a processor coupled to the memory and configured to:

monitor a plurality of control channels, wherein each control channel of the plurality of control channels is configured to include a slot format indication (SFI) for one or more slots;

detect at least one SFI on at least one control channel of the plurality of control channels;

identify a set of symbols in a slot to transmit radio resource control (RRC) configured uplink signals to a network entity;

determine whether the set of symbols in the slot is configured as uplink, flexible, or downlink based at least in part on the detected at least one SFI on the at least one control channel of the plurality of control channels;

transmit the RRC configured uplink signals when it is determined that the set of symbols in the slot is configured as uplink; and cancel transmission of the RRC configured uplink signals when it is determined that the set of symbols in the slot is configured as flexible or downlink.

12. The apparatus of claim 11, wherein the processor is further configured to:

identify at least one control channel of the plurality of control channels where an SFI with a range that includes the set of symbols in the slot is detected.

13. The apparatus of claim 12, wherein the processor is further configured to:

determine that the SFI is detected in the at least one control channel in advance of the set of symbols in the slot by a threshold amount of time; and determine whether the set of symbols in the slot is configured as uplink, flexible, or downlink based at least in part on the SFI.

14. The apparatus of claim 12, wherein the processor is further configured to:

determine that the SFI is detected in the at least one control channel within a threshold amount of time prior to the set of symbols in the slot; and determine whether the set of symbols in the slot is configured as uplink, flexible, or downlink independently of the SFI.

15. The apparatus of claim 11, wherein the processor is further configured to:

identify that at least one SFI is detected in at least one of the plurality of control channels, wherein the detected at least one SFI fails to cover a range that includes the set of symbols, and that at least one SFI is undetected in at least one of the plurality of control channels;

determine that the slot is configured as flexible based at least in part on the identifying; and cancel transmission of the RRC configured uplink signals based at least in part on the determination.

16. The apparatus of claim 11, wherein the processor is further configured to:
 identify that at least one SFI is detected in at least one of the plurality of control channels, wherein the detected at least one SFI fails to cover a range that includes the set of symbols, and that no SFIs are undetected in the plurality of control channels;
 determine that the slot is configured as uplink based at least in part on the identifying; and
 transmit the RRC configured uplink signals based at least in part on the determination.

17. The apparatus of claim 11, wherein each control channel of the plurality of control channels is configured to include an SFI indicating slot formats for one or more slots with a range that potentially includes the set of symbols in the slot.

18. The apparatus of claim 17, wherein the plurality of control channels is identified based at least in part on a maximum range of SFIs.

19. The apparatus of claim 18, wherein the maximum range of SFIs is determined based at least in part on a look-up table that indicates a relationship between SFIs and slot formats for ranges of slots.

20. The apparatus of claim 11, wherein the RRC configured uplink signals comprise a scheduling request (SR), sounding reference signals (SRSs), uplink signals scheduled using semi-persistent scheduling (SPS), or a combination thereof.

21. An apparatus for wireless communication at a user equipment (UE), comprising:
 means for monitoring a plurality of control channels, wherein each control channel of the plurality of control channels is configured to include a slot format indication (SFI) for one or more slots;
 means for detecting at least one SFI on at least one control channel of the plurality of control channels;
 means for identifying a set of symbols in a slot to transmit radio resource control (RRC) configured uplink signals to a network entity;
 means for determining whether the set of symbols in the slot is configured as uplink, flexible, or downlink based at least in part on the detected at least one SFI on the at least one control channel of the plurality of control channels;
 means for transmitting the RRC configured uplink signals when it is determined that the set of symbols in the slot is configured as uplink; and
 means for canceling transmission of the RRC configured uplink signals when it is determined that the set of symbols in the slot is configured as flexible or downlink.

22. The apparatus of claim 21, further comprising:
 means for identifying at least one control channel of the plurality of control channels where an SFI with a range that includes the set of symbols in the slot is detected.

23. The apparatus of claim 22, further comprising:
 means for determining that the SFI is detected in the at least one control channel in advance of the set of symbols in the slot by a threshold amount of time; and
 means for determining whether the set of symbols in the slot is configured as uplink, flexible, or downlink based at least in part on the SFI.

24. The apparatus of claim 22, further comprising:
 means for determining that the SFI is detected in the at least one control channel within a threshold amount of time prior to the set of symbols in the slot; and
 means for determining whether the set of symbols in the slot is configured as uplink, flexible, or downlink independently of the SFI.

25. The apparatus of claim 22, wherein each control channel of the plurality of control channels is configured to include an SFI indicating slot formats for one or more slots with a range that potentially includes the set of symbols in the slot.

26. A non-transitory computer-readable medium storing code for wireless communication, the code comprising instructions executable by a processor to:
 monitor a plurality of control channels, wherein each control channel of the plurality of control channels is configured to include a slot format indication (SFI) for one or more slots;
 detect at least one SFI on at least one control channel of the plurality of control channels;
 identify a set of symbols in a slot to transmit radio resource control (RRC) configured uplink signals to a network entity;
 determine whether the set of symbols in the slot is configured as uplink, flexible, or downlink based at least in part on the detected at least one SFI on the at least one control channel of the plurality of control channels;
 transmit the RRC configured uplink signals when it is determined that the set of symbols in the slot is configured as uplink; and
 cancel transmission of the RRC configured uplink signals when it is determined that the set of symbols in the slot is configured as flexible or downlink.

27. The non-transitory computer-readable medium of claim 26, wherein the instructions are further executable by the processor to:
 identify at least one control channel of the plurality of control channels where an SFI with a range that includes the set of symbols in the slot is detected.

28. The non-transitory computer-readable medium of claim 27, wherein the instructions are further executable by the processor to:
 determine that the SFI is detected in the at least one control channel in advance of the set of symbols in the slot by a threshold amount of time; and
 determine whether the set of symbols in the slot is configured as uplink, flexible, or downlink based at least in part on the SFI.

29. The non-transitory computer-readable medium of claim 27, wherein the instructions are further executable by the processor to:
 determine that the SFI is detected in the at least one control channel within a threshold amount of time prior to the set of symbols in the slot; and
 determine whether the set of symbols in the slot is configured as uplink, flexible, or downlink independently of the SFI.

30. The non-transitory computer-readable medium of claim 26, wherein each control channel of the plurality of control channels is configured to include an SFI indicating slot formats for one or more slots with a range that potentially includes the set of symbols in the slot.

* * * * *